(12) United States Patent
Gokan et al.

(10) Patent No.: US 9,409,574 B2
(45) Date of Patent: Aug. 9, 2016

(54) VEHICLE ACCELERATION SUPPRESSION DEVICE AND VEHICLE ACCELERATION SUPPRESSION METHOD

(71) Applicant: NISSAN MOTOR CO., LTD., Yokohama-shi, Kanagawa (JP)

(72) Inventors: Toshimichi Gokan, Machida (JP); Takuya Inoue, Kawasaki (JP); Takeshi Sugano, Yokohama (JP); Kazutomo Otani, Atsugi (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/441,239

(22) PCT Filed: Nov. 12, 2013

(86) PCT No.: PCT/JP2013/006650
§ 371 (c)(1),
(2) Date: May 7, 2015

(87) PCT Pub. No.: WO2014/083787
PCT Pub. Date: Jun. 5, 2014

(65) Prior Publication Data
US 2015/0307091 A1    Oct. 29, 2015

(30) Foreign Application Priority Data

Nov. 27, 2012  (JP) ................................. 2012-259183
Nov. 27, 2012  (JP) ................................. 2012-259185

(51) Int. Cl.
*G06F 7/70*      (2006.01)
*H04N 7/18*      (2006.01)
(Continued)

(52) U.S. Cl.
CPC *B60W 30/09* (2013.01); *B60T 7/22* (2013.01); *B60W 10/04* (2013.01); *B60W 10/18* (2013.01);
(Continued)

(58) Field of Classification Search
USPC ............................................ 701/70; 348/148
See application file for complete search history.

(56) References Cited

U.S. PATENT DOCUMENTS 6,044,321 A * 3/2000 Nakamura ......... B60K 31/0008
                                                    180/179
6,259,992 B1   7/2001 Urai et al.
(Continued)

FOREIGN PATENT DOCUMENTS

DE         10347980 A1   3/2005
JP         07-049999 A   2/1995
(Continued)

*Primary Examiner* — Thomas G Black
*Assistant Examiner* — Tyler Paige
(74) *Attorney, Agent, or Firm* — Young Basile Hanlon & MacFarlane, P.C.

(57) ABSTRACT

A vehicle acceleration suppression device and a vehicle acceleration suppression method, capable of activating acceleration suppression control appropriately, include a travel controller configured to determine a type of the obstacle (such as a wall, another vehicle, an edge stone, or a natural thing) based on at least a first-time detection distance that is the distance between a vehicle and an obstacle detected for the first time and a height determination distance that is the distance between the vehicle and the obstacle detected when the obstacle is determined to be a tall obstacle. Then, acceleration suppression control is carried out in a control manner depending on the determined type of the obstacle when it is determined that the vehicle has approached the obstacle at an approach degree equal to or higher than a predefined approach degree based on the distance between the vehicle and the obstacle.

16 Claims, 16 Drawing Sheets

(51) Int. Cl.
  *B60W 30/09* (2012.01)
  *B60W 50/08* (2012.01)
  *B60T 7/22* (2006.01)
  *B60W 10/04* (2006.01)
  *B60W 10/18* (2012.01)
  *G01S 15/93* (2006.01)
  *B60W 30/06* (2006.01)

(52) U.S. Cl.
  CPC ............ *B60W 50/087* (2013.01); *G01S 15/931* (2013.01); *B60T 2201/022* (2013.01); *B60W 30/06* (2013.01); *B60W 2420/54* (2013.01); *B60W 2540/10* (2013.01); *B60W 2550/10* (2013.01); *B60W 2720/106* (2013.01)

(56) References Cited

U.S. PATENT DOCUMENTS

| | | | |
|---|---|---|---|
| 6,342,832 B1 | 1/2002 | Fuchs et al. | |
| 6,583,403 B1 | 6/2003 | Koike et al. | |
| 6,944,544 B1* | 9/2005 | Prakah-Asante | ... B60R 21/0134 342/42 |
| 2003/0045991 A1* | 3/2003 | Isogai | ............ B60K 31/0008 701/96 |
| 2004/0011596 A1* | 1/2004 | Miller | .................. B60T 17/22 188/1.11 W |
| 2005/0004761 A1* | 1/2005 | Takahama | ............ G01S 17/936 701/301 |
| 2007/0043502 A1* | 2/2007 | Mudalige | .................. B60T 7/22 701/301 |
| 2007/0080793 A1* | 4/2007 | Blase | .................. B60Q 1/0023 340/435 |
| 2007/0191997 A1* | 8/2007 | Isaji | ........................ B60T 7/22 701/1 |
| 2011/0037853 A1* | 2/2011 | Shiraishi | ............... G01S 13/931 348/148 |
| 2012/0173068 A1 | 7/2012 | Seiter et al. | |
| 2013/0154854 A1* | 6/2013 | Chen | .................. G08G 1/096741 340/905 |
| 2013/0311083 A1 | 11/2013 | Mikami et al. | |
| 2014/0244120 A1* | 8/2014 | Fujii | .................... B60W 10/06 701/58 |

FOREIGN PATENT DOCUMENTS

| | | |
|---|---|---|
| JP | 2000057497 A | 2/2000 |
| JP | 2001519286 A | 10/2001 |
| JP | 2009222645 A | 10/2009 |
| JP | 2010164356 A | 7/2010 |
| JP | 2011109170 A | 6/2011 |
| WO | 2012120583 A1 | 9/2012 |

* cited by examiner

FIG. 6A
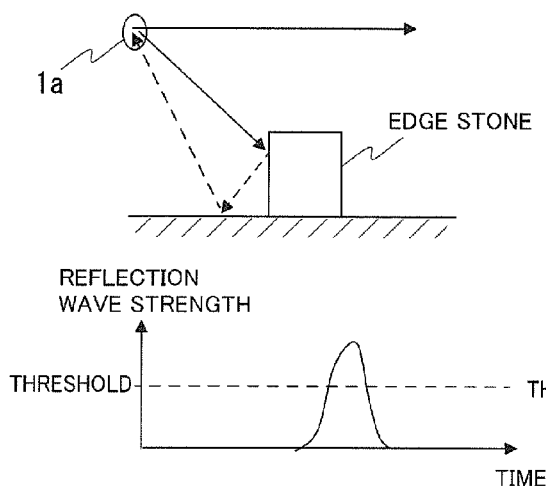
FIG. 6B
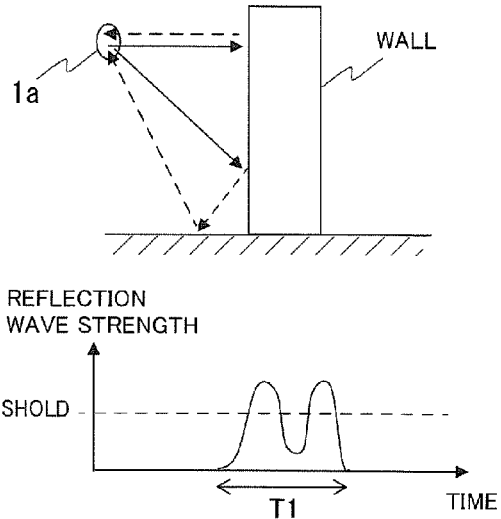
FIG. 7
|  | DECISION LEVEL | | | |
|---|---|---|---|---|
|  | Lv0 | Lv1 | Lv2 | Lv3 |
| THRESHOLD OF FIRST-TIME DETECTION DISTANCE La | 0 | 250 | 300 | 350 |
| THRESHOLD OF HEIGHT DETERMINATION DISTANCE Lb | 0 | 100 | 150 | 200 |
| THRESHOLD OF PLURAL-TIME DETECTION DISTANCE Lc | 0 | 80 | 230 | 300 |
| THRESHOLD OF Ld (FIRST-TIME DETECTION DISTANCE − HEIGHT DETERMINATION DISTANCE) | 500 | 300 | 250 | 200 |

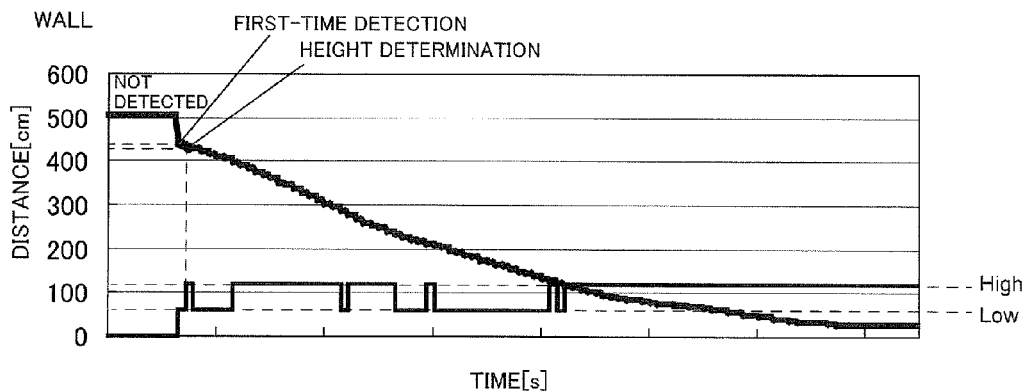
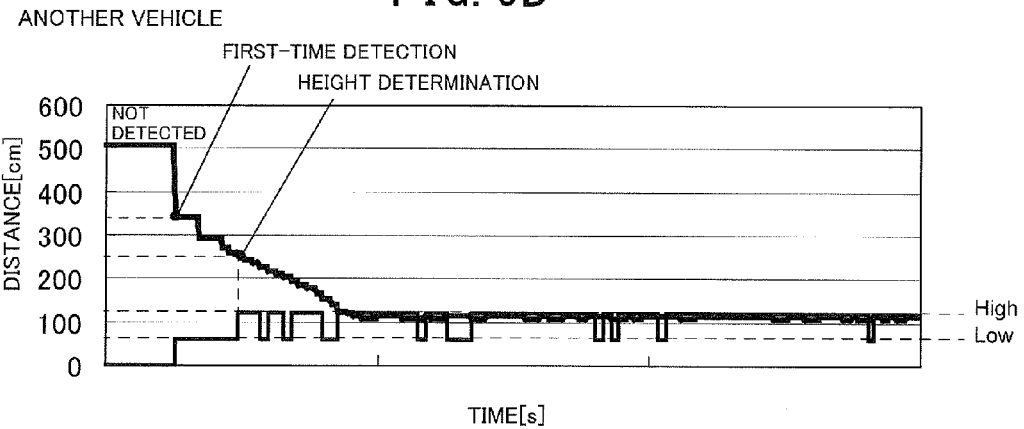
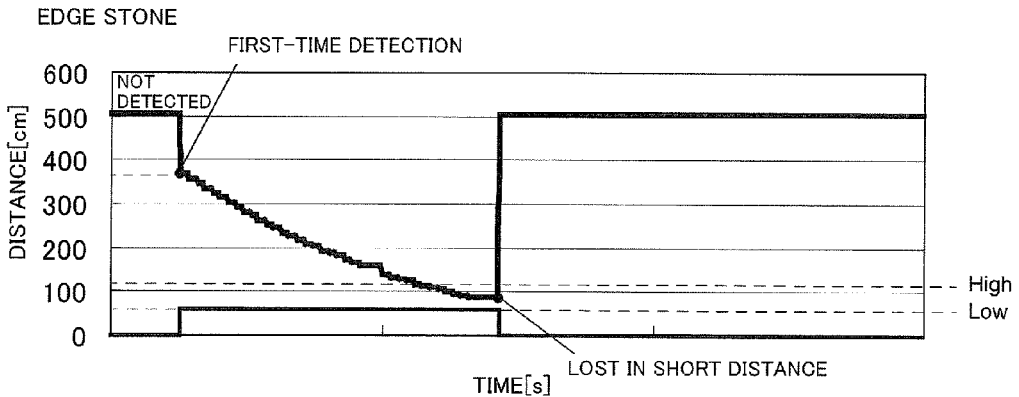

FIG. 18

| m/s | Lv3 | | | | Lv2 | | | | Lv1 | | | |
|---|---|---|---|---|---|---|---|---|---|---|---|---|
| | TH$_{13}$ | TH$_{23}$ | TH$_{33}$ | TH$_{43}$ | TH$_{12}$ | TH$_{22}$ | TH$_{32}$ | TH$_{42}$ | TH$_{11}$ | TH$_{21}$ | TH$_{31}$ | TH$_{41}$ |
| 0 | 350 | 200 | 300 | 300 | 300 | 150 | 230 | 250 | 250 | 100 | 80 | 200 |
| 1 | 318 | 200 | 268 | 300 | 268 | 150 | 198 | 250 | 218 | 100 | 80 | 200 |
| 1.5 | 302 | 200 | 252 | 300 | 252 | 150 | 182 | 250 | 202 | 100 | 80 | 200 |
| 2 | 300 | 200 | 236 | 300 | 236 | 150 | 175 | 250 | 186 | 100 | 80 | 200 |
| 2.5 | 300 | 200 | 225 | 300 | 225 | 150 | 175 | 250 | 175 | 100 | 80 | 200 |
| 3 | 300 | 200 | 225 | 300 | 225 | 150 | 175 | 250 | 175 | 100 | 80 | 200 |
| 3.5 | 300 | 200 | 225 | 300 | 225 | 150 | 175 | 250 | 175 | 100 | 80 | 200 |
| 4 | 300 | 200 | 225 | 300 | 225 | 150 | 175 | 250 | 175 | 100 | 80 | 200 |
| 4.5 | 300 | 200 | 225 | 300 | 225 | 150 | 175 | 250 | 175 | 100 | 80 | 200 |
| 5 | 300 | 200 | 225 | 300 | 225 | 150 | 175 | 250 | 175 | 100 | 80 | 200 |

# VEHICLE ACCELERATION SUPPRESSION DEVICE AND VEHICLE ACCELERATION SUPPRESSION METHOD

CROSS REFERENCE TO RELATED APPLICATIONS

The present application claims priority to Japanese Patent Application Nos. 2012-259183, filed Nov. 27, 2012 and 2012-259185, filed Nov. 27, 2012, each incorporated herein in its entirety.

TECHNICAL FIELD

The present disclosure relates to a vehicle acceleration suppression device and a vehicle acceleration suppression method for performing acceleration suppression control as a drive assist to avoid an obstacle.

BACKGROUND

In one technology, for example, there is a technique as disclosed in JP 2010-164356 A for detecting an obstacle existing ahead in a travel direction of the vehicle. In this technique, reflected waves of spherical surface transmission waves that have been emitted by an in-vehicle sonar are captured, so that the obstacle is detected. Here, in order to distinguish between the reflected wave from a road surface and the reflected wave from an obstacle, a threshold pattern for removing the reflected wave from the road surface is set and the threshold pattern is removed from the reflected wave that has been captured, so that the obstacle is detected.

In the technique as disclosed in JP 2010-164356 A, however, a road surface and an obstacle can be distinguished from each other, but the type of the obstacle cannot be determined. Therefore, when acceleration suppression control is performed as a drive assist for suppressing a contact between a vehicle and an obstacle such as a wall or another vehicle, the acceleration suppression control is activated for the obstacles, such as a curb stone, edge stone, or grass (natural thing), for which the acceleration suppression is not needed, making a troublesome situation.

SUMMARY

Thus, the present disclosure intends to provide a vehicle acceleration suppression device and a vehicle acceleration suppression method, capable of activating the acceleration suppression control appropriately.

To address the above issue, in one embodiment of the present disclosure, an in-vehicle sonar configured to emit a transmission wave forward in a travel direction of a vehicle is provided. An obstacle distance detector is configured to receive a reflection wave of the transmission wave emitted by the in-vehicle sonar, and to detect a distance between the vehicle and an obstacle existing ahead in the travel direction of the vehicle. An obstacle height determination unit is configured to receive the reflection wave of the transmission wave emitted by the in-vehicle sonar, and to determine whether or not the obstacle existing ahead in the travel direction of the vehicle is a tall obstacle that is as tall as the vehicle or taller than the vehicle. In addition, an obstacle type determination unit is configured to determine a type of the obstacle based on at least a first-time detection distance that is the distance between the vehicle and the obstacle detected by the obstacle distance detector for a first time, and a height determination distance that is the distance between the vehicle and the obstacle detected by the obstacle distance detector when the obstacle distance detector determines that the obstacle is the tall obstacle for the first time. Further, an acceleration suppression controller is configured to carry out acceleration suppression control in a control manner depending on a determination result made by the obstacle type determination unit, when it is determined that the vehicle has approached the obstacle at an approach degree equal to or higher than a predefined approach degree based on the distance between the vehicle and the obstacle detected by the obstacle distance detector.

According to the present disclosure, the type of the obstacle detected by capturing the reflection wave of the transmission wave emitted by the in-vehicle sonar can be determined, so that the control manner of the acceleration suppression control can be changed depending on the type of the obstacle. In other words, the magnitude and activation/non-activation of the acceleration suppression control can be changed by the type of the obstacle. Thus, while restraining annoying feeling given to a driver, the drive assist to avoid the obstacle can be performed appropriately.

BRIEF DESCRIPTION OF THE DRAWINGS

FIG. 6A and FIG. 6B are views illustrative of a height determination method of the obstacle;

FIG. 7 is a view illustrative of a decision level determination threshold;

FIG. 9A to FIG. 9C are views illustrative of differences between an obstacle distance detection result by the obstacle type and the height determination result;

FIG. 18 is a view illustrative of another example of the decision level determination threshold.

DETAILED DESCRIPTION OF THE EMBODIMENTS

Hereinafter, embodiments of the present disclosure will be described with reference to the attached drawings.

First Embodiment

Configuration

Figure 1:
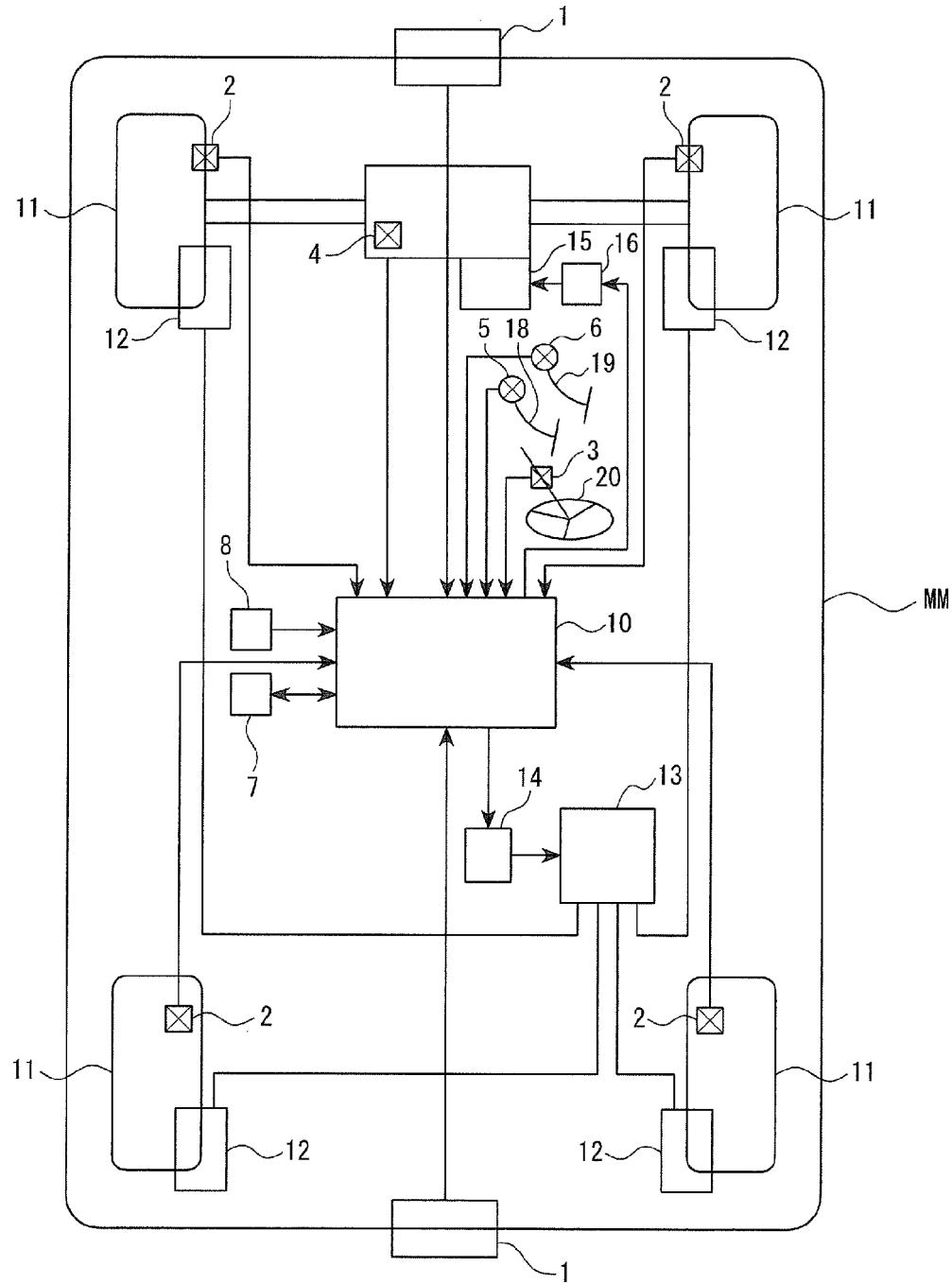
FIG. 1 is a conceptual view illustrative of a configuration of a vehicle in one embodiment of the present disclosure.

FIG. 1 is a conceptual view illustrative of a configuration of a vehicle in the present embodiment.

In the drawing, a code MM denotes the vehicle. The vehicle MM includes a brake device that generates a brake force and a drive device that generates a drive force.

The brake device is configured to include brake devices 12 respectively arranged for wheels 11, a fluid pressure circuit 13 including piping connected to each of the brake devices 12, and a brake controller 14. The brake controller 14 is configured to control a brake force generated by each brake device 12 to a value depending on a brake force instruction value through the fluid pressure circuit 13. It is to be noted that the brake device 12 is not limited to a device that applies a brake force by fluid pressure, and may be an electric brake device or the like.

The drive device is configured to include an engine 15 as a drive source, and an engine controller 16 configured to control the torque (drive force) generated by the engine 15 to a value depending on an acceleration instruction value. It is to be noted that the drive source of the drive device is not limited to the engine 15, and may be an electric motor, or may have a hybrid configuration in which a motor is combined with the engine 15.

The brake controller 14 and the engine controller 16 are each configured to receive an instruction value from a travel controller 10 which is a higher controller. In other words, the brake controller 14 is configured to receive a brake instruction (brake force instruction value) from the travel controller 10, and the engine controller 16 is configured to receive a drive instruction (acceleration instruction value) from the travel controller 10.

Also, the vehicle MM is configured to include a surrounding environment recognition sensor 1, a wheel speed sensor 2, a steering angle sensor 3, a shift position sensor 4, a brake manipulation detection sensor 5, an accelerator manipulation detection sensor 6, a navigation device 7, and an ignition switch 8.

The surrounding environment recognition sensor 1 is configured to recognize an obstacle in surroundings (at least ahead in a travel direction) of the vehicle MM, and to output the information (surrounding environment recognition information) to the travel controller 10. The surrounding environment recognition sensor 1 is configured to include one or plural sonars (ultrasonic exploratory device) capable of detecting an obstacle.

Figure 2:
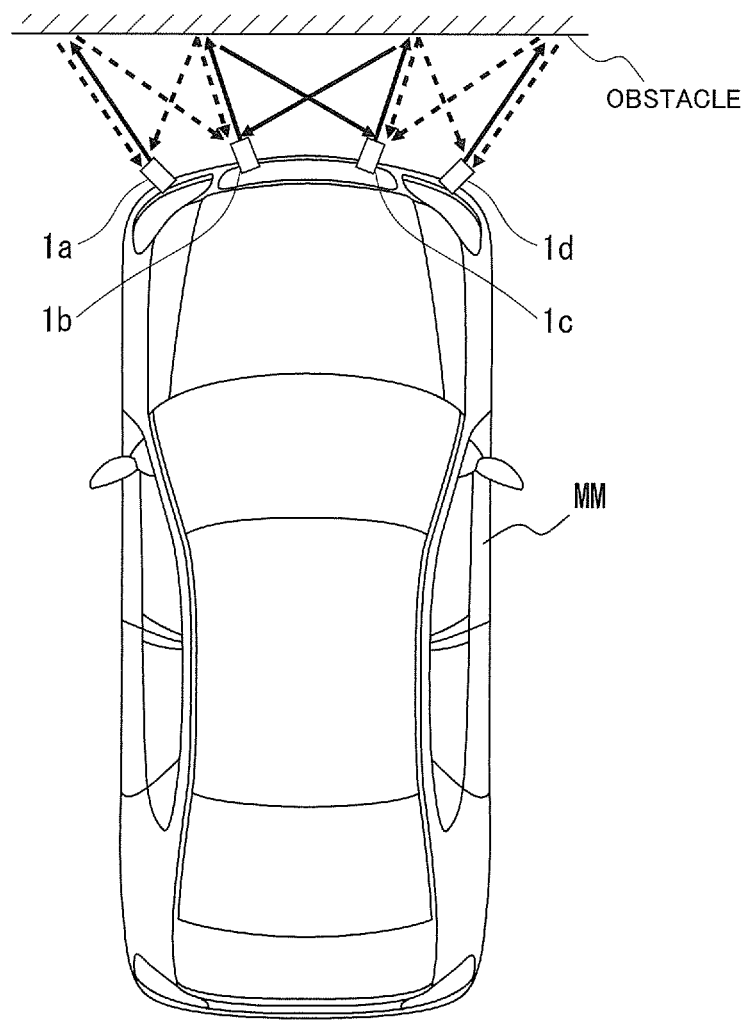
FIG. 2 is a view illustrative of an obstacle detection method by a sonar.

In the present embodiment, four sonars 1a to 1d are arranged at the front side and the rear side of the vehicle MM, respectively. As the sonars 1a to 1d arranged at the front side of the vehicle MM are illustrated in FIG. 2, the sonars 1a to 1d are arranged in alignment in the width direction of the vehicle MM. Each sonar is configured to emit a spherical surface transmission wave to a measuring object at every predefined time, and to measure the location, the distance, and the like of the obstacle by receiving a reflection wave of the transmission wave from the obstacle.

In FIG. 2, solid arrow lines indicate the transmission waves emitted forward by the sonars 1a to 1d, whereas dotted arrow lines indicate reflection waves. Thus, each sonar is also configured to receive the reflection waves of the transmission waves emitted by its adjacent sonars. Hence, if four sonars are arranged, ten detection distance values will be acquired from ten reflection waves. In the present embodiment, the shortest one of the ten detection distance values is employed as a distance between the vehicle MM and the obstacle.

The wheel speed sensor 2 is configured to detect the speed of the wheel, and to output detected wheel speed information to the travel controller 10. The wheel speed sensor 2 is configured with, for example, a pulse generator such as a rotary encoder for measuring a wheel speed pulse.

The steering angle sensor 3 is configured to detect a steering angle of the steering wheel 20, and to output detected steering angle information to the travel controller 10. The steering angle sensor 3 is arranged at a steering shaft or the like. It is to be noted that the turning angle of the steering wheel may be detected as steering angle information.

The shift position sensor 4 is configured to detect a shift position (drive instruction position, parking instruction position, neutral position, and the like), and to output the detected shift position to the travel controller 10 as shift information.

The brake manipulation detection sensor 5 is configured to detect a presence or absence of manipulation or a manipulation amount of the brake pedal 18. The detected brake pedal manipulation amount is output to the travel controller 10. The brake pedal 18 is a manipulation element to be manipulated by a driver for instructing the speed deceleration.

The accelerator manipulation detection sensor 6 is configured to detect a manipulation amount of the accelerator pedal 19. The detected accelerator pedal manipulation amount is output to the travel controller 10. The accelerator pedal 19 is a manipulation element to be manipulated by a driver for instructing the speed acceleration.

The navigation device 7 is configured to include a GPS receiver, a map database, a display monitor, and the like, and is a device for performing a route search, route guidance, and the like. The navigation device 7 is configured to acquire road information such as a type of a road, a width of the road, and the like of the road on which the vehicle MM travels, based on the current location of the vehicle V acquired by using the GPS receiver and the road information stored in the map database.

Further, the vehicle MM includes an information presentation device, not illustrated. The information presentation device is configured to output a warning or another presentation in a sound or image in response to a control signal from the travel controller 10. The information presentation device is configured to include, for example, a speaker to provide information to a driver in a buzzer or voice, and a display unit to provide information by presenting an image or text. The display unit may also use a display monitor of the navigation device 26.

The travel controller 10 is an electronic control unit including a CPU and peripheral devices such as a ROM, RAM, and the like, and is configured to carry out a drive assist process to avoid the obstacle.

Figure 3:
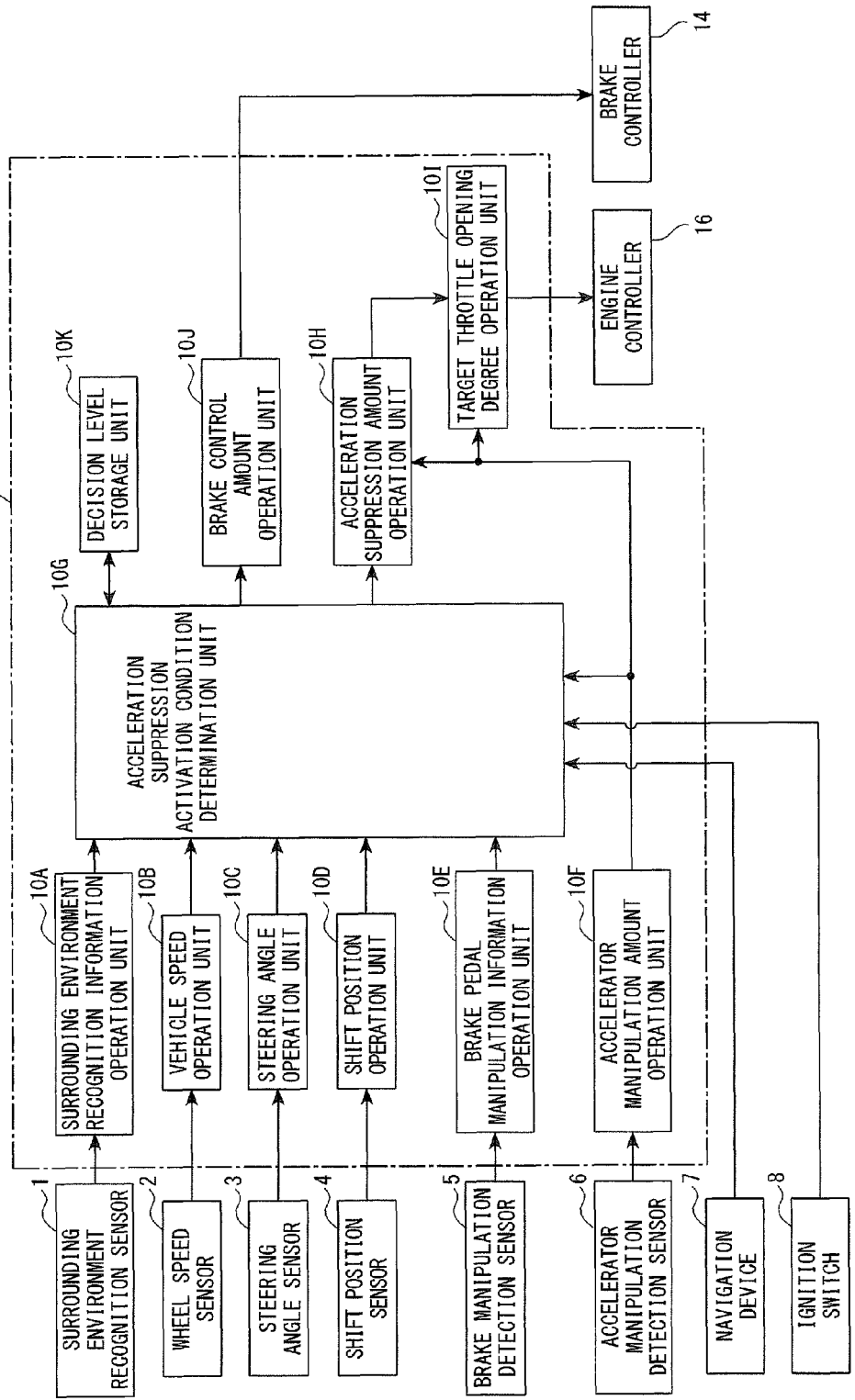
FIG. 3 is a view illustrative of a configuration of a travel controller.

FIG. 3 is a block view illustrative of a configuration of the travel controller 10. As illustrated in FIG. 3, the travel controller 10 is configured to include a surrounding environment recognition information operation unit 10A, a vehicle speed operation unit 10B, a steering angle operation unit 10C, and a shift position operation unit 10D, a brake pedal manipulation information operation unit 10E, an accelerator manipulation amount operation unit 10F, an acceleration suppression activation determination unit 10G, an acceleration suppression amount operation unit 10H, a target throttle opening degree operation unit 10I, a brake control amount operation unit 10J, and a decision level storage unit 10K.

The surrounding environment recognition information operation unit 10A is configured to recognize an environment surrounding the vehicle based on a signal from the surrounding environment recognition sensor 1. Herein, information on the obstacle (the presence or absence of obstacle, the location of the obstacle, the distance between the vehicle MM and the obstacle) in the surrounding of the vehicle is recognized from the reflection waves detected by the sonars 1a to 1d arranged as the surrounding environment recognition sensor 1. The reflection wave, which was received at a timing immediately before the sonars 1a to 1d emit the transmission waves, is determined to be a noise emitted from the outside, and is excluded from a subject of the obstacle detection.

The vehicle speed operation unit 10B is configured to operate the vehicle speed based on the signal from the wheel speed sensor 2. The steering angle operation unit 10C is configured to operate the steering angle based on the signal from the steering angle sensor 3. The shift position operation unit 10D is configured to determine the shift position based on the signal from the shift position sensor 4. The brake pedal manipulation information operation unit 10E is configured to determine the brake manipulation amount based on the signal from the brake manipulation detection sensor 5. The accelerator manipulation amount operation unit 10F is configured to operate the manipulation amount of accelerator pedal 19 based on the signal from the accelerator manipulation detection sensor 6.

The acceleration suppression activation determination unit 10G is configured to receive various pieces of information and to determine whether or not acceleration suppression control for suppressing the acceleration of the vehicle MM need to be carried out, as a drive assist process to avoid the obstacle. Here, the acceleration suppression control includes drive force limit control for limiting the drive force of the vehicle MM and brake force control for generating a brake force in the vehicle MM.

Figure 4:
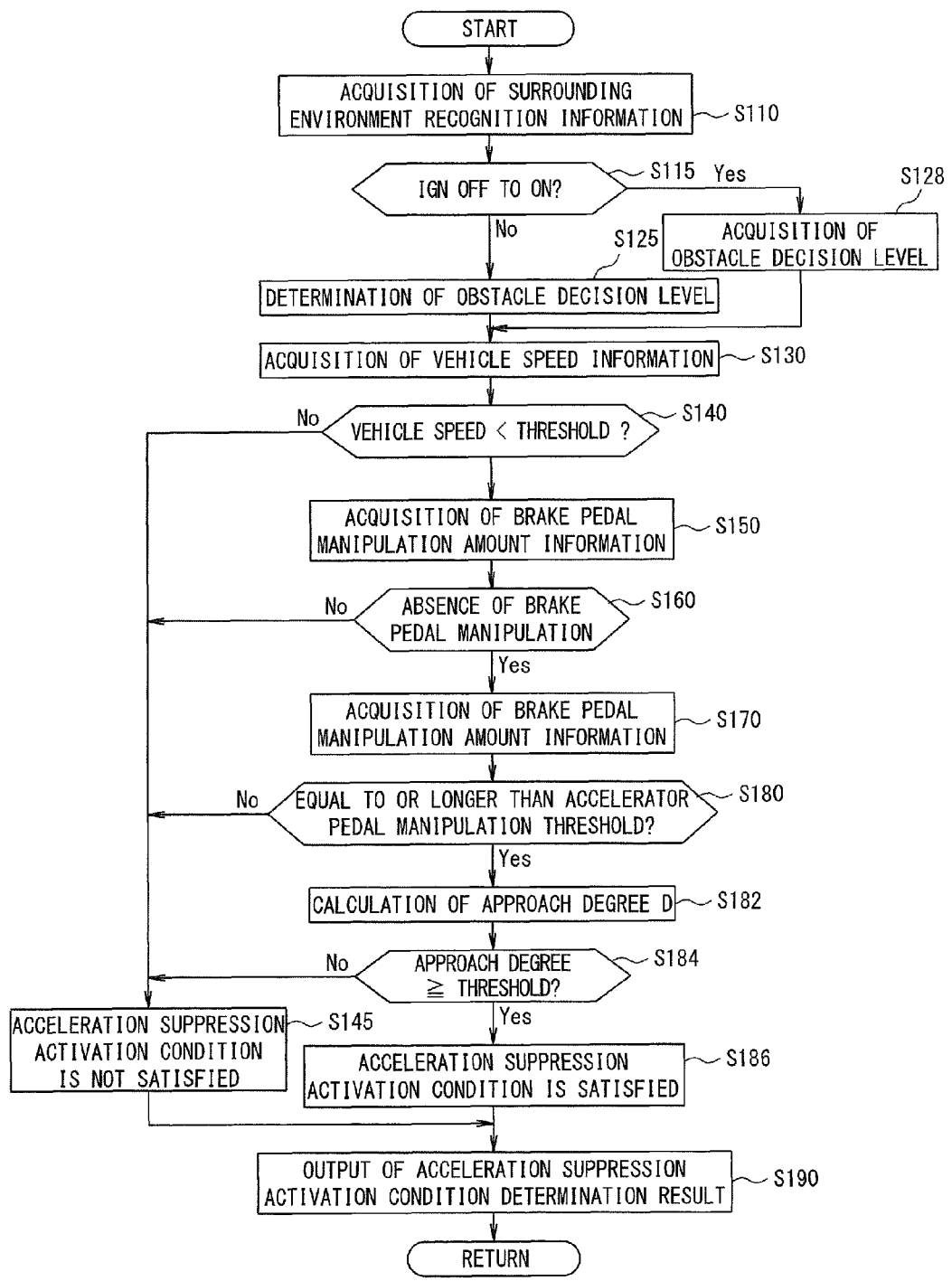
FIG. 4 is a flow chart illustrative of an acceleration suppression activation determination process procedure.

FIG. 4 is a flow chart illustrative of an acceleration suppression activation determination process procedure to be carried out by the acceleration suppression activation determination unit 10G. The acceleration suppression activation determination process starts when the ignition switch 8 is turned on, and is carried out at every predefined sampling time.

At first, in step S110, the acceleration suppression activation determination unit 10G acquires the surrounding environment recognition information from the surrounding environment recognition information operation unit 10A, and processing goes to step S115.

In step S115, the acceleration suppression activation determination unit 10G determines whether or not the timing is immediately after the ignition switch 8 is turned on from the state where the ignition switch 8 is turned off. Then, when it is determined that the timing is not immediately after the ignition switch 8 is turned on, the processing goes to step S125. When it is determined that the timing is immediately after the ignition switch 8 is turned on, the processing goes to step S128.

In step S125, the acceleration suppression activation determination unit 10G determines whether or not there is an obstacle in the course ahead in the travel direction based on the surrounding environment recognition information recognized in the above step S110. Then, when there is an obstacle, the acceleration suppression activation determination unit 10G determines a decision level of the obstacle. Herein, the decision level of the obstacle is determined depending on the type of obstacle (such as a wall, another vehicle, an edge stone, or a natural thing (grass)). Smaller values are set in the order of a wall, another vehicle, an edge stone, and a natural thing.

Figure 5:
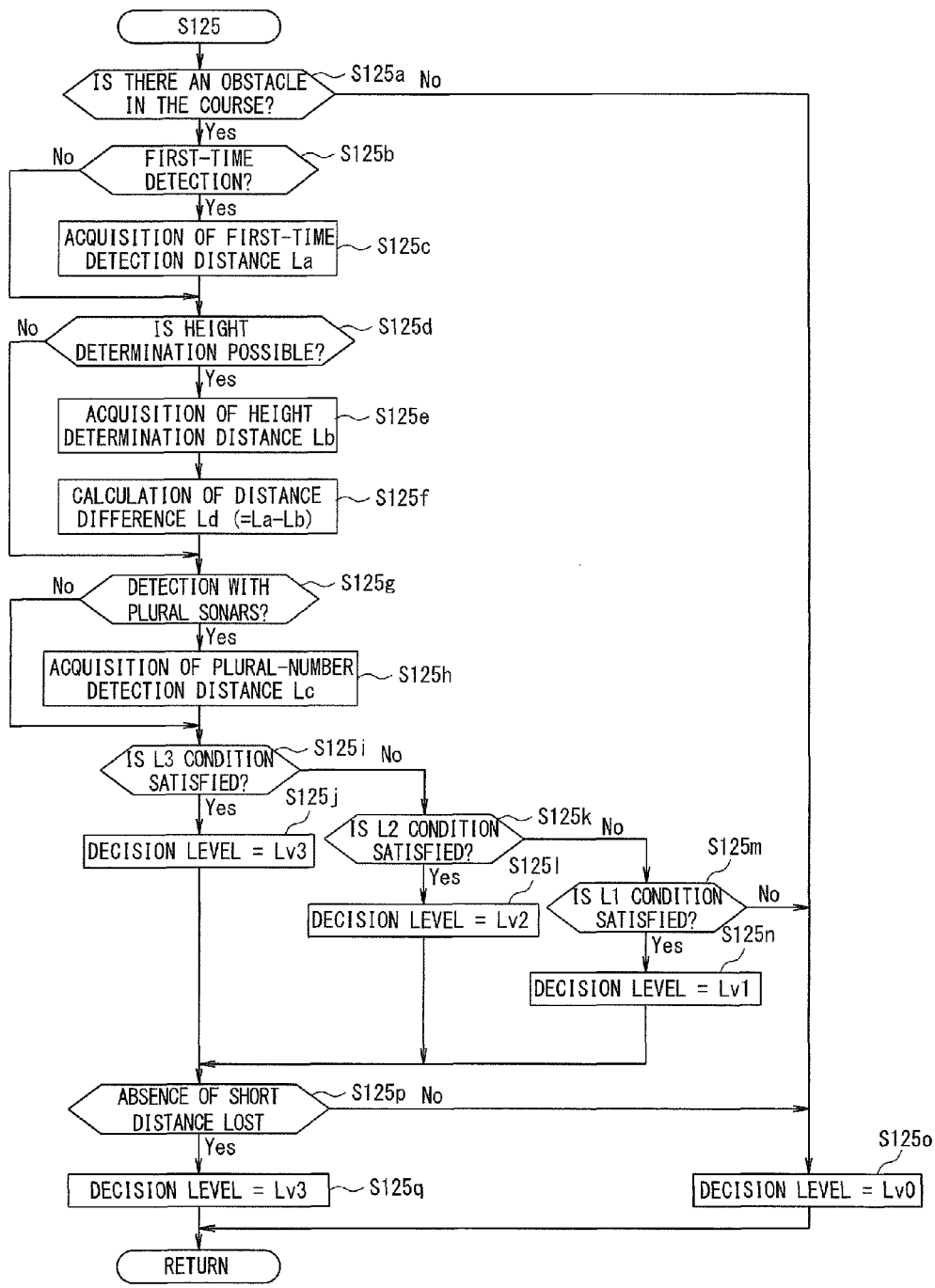
FIG. 5 is a flow chart illustrative of a decision level determination process procedure.

FIG. 5 is a flow chart illustrative of a decision level determination process procedure to be carried out in step S125. At first, in step S125a, the acceleration suppression activation determination unit 10G determines whether or not there is an obstacle in the course ahead in the travel direction based on the surrounding environment recognition information recognized in the above step S110. In this situation, firstly, the course of the vehicle MM is estimated based on the steering angle information. Next, a range having a similar width to the vehicle MM in the estimated course of the vehicle MM is set as a course of the vehicle MM, and whether or not there is an obstacle in the course is determined.

Then, when it is determined that there is an obstacle, the processing goes to step S125b. On the other hand, when it is determined that there is no obstacle, the processing goes to step S125o to be described later.

In step S125b, the acceleration suppression activation determination unit 10G determines whether or not such a detected obstacle has been detected for the first time. In other words, in the process while the vehicle MM is approaching the obstacle, it is determined whether or not the obstacle has been detected for the first time. Then, when the obstacle was not detected at the previous sampling and the obstacle is detected at the current sampling, it is determined that the detection has been made for the first time and the processing goes to step S125c. On the other hand, when the detection has not been made for the first time, that is when the obstacle was also detected at the previous sampling, the processing goes to step S125d to be described later.

In step S125c, the acceleration suppression activation determination unit 10G acquires the distance from the current location of the vehicle MM to the obstacle as a first-time detection distance La, and the processing goes to step S125d.

In step S125d, the acceleration suppression activation determination unit 10G determines whether or not a height determination of the obstacle is possible. Herein, when it can be determined that the detected obstacle is a tall obstacle that is as tall as the vehicle or taller than arranged heights of the sonar 1a to 1d installed in the vehicle MM, the height determination of the obstacle is assumed possible.

For example, when an edge stone is detected by the sonar 1a, as illustrated in the upper section of FIG. 6A, in the transmission waves emitted from the sonar 1a, the transmission wave emitted in the road surface direction (obliquely downward) is reflected by an edge stone, such a reflection wave is again reflected on the road surface, and the sonar 1a receives the reflection wave. On the other hand, the transmission wave emitted by the sonar 1a in the horizontal direction passes above the edge stone, and therefore the sonar 1a does not receive the reflection wave of the transmission wave. Thus, the strength property of the reflection wave received by the sonar 1a, as illustrated in the lower section of FIG. 6A, has a single peak higher than an obstacle detection threshold.

In contrast, when a wall is detected by the sonar 1a, as illustrated in the upper section of FIG. 6B, the transmission wave emitted horizontally by the sonar 1a is reflected by the wall. Therefore, the sonar 1a receives the reflection wave directly. In other words, the sonar 1a receives both of the reflection wave of the transmission wave emitted obliquely downward and the reflection wave of the transmission wave emitted horizontally. Thus, the strength property of the reflection waves received by the sonar 1a, as illustrated in the lower section of FIG. 6B, has two peaks higher than the obstacle detection threshold in a short period T1. It is to be noted that T1 is a length of time while it can be determined that the received reflection waves are the reflection waves from an identical obstacle.

Thus, whether or not the detected obstacle is a tall obstacle is determined by utilizing the fact that strength property of the reflection wave is varied depending on the height of the obstacle. Then, when it is determined for the first time that the detected obstacle is a tall obstacle, the processing goes to step S125e. When it is determined that it is not a tall obstacle or when it has been already determined that it is a tall obstacle, the processing goes to step S125g to be described later.

In step S125e, the acceleration suppression activation determination unit 10G acquires the distance from the current location of the vehicle MM to the obstacle as a height determination distance Lb, and the processing goes to step S125f. In other words, the height determination distance Lb is a distance from the vehicle MM to the obstacle at a time point when the height determination of the obstacle is enabled (the time point when it can be determined that the obstacle is a tall obstacle).

In step S125f, the acceleration suppression activation determination unit 10G calculates a distance Ld (=a−Lb) obtained by subtracting the height determination distance Lb acquired in step S125e from the first-time detection distance La acquired in step S125c, and the processing goes to step S125g.

Next, in step S125g, the acceleration suppression activation determination unit 10G determines whether or not an identical obstacle is detected by plural sonars. In this situation, it is determined whether or not such an identical obstacle is detected by at least two adjacent sonars. To be specific, in a case where two adjacent sonars receive the reflection wave (direct reflection wave) of the transmission wave emitted by oneself and the reflection wave (indirect reflection wave) of the transmission wave emitted by the other one, respectively, and the detection distance values are acquired from the direct reflection wave and the indirect reflection wave, it is determined that an identical obstacle is detected by these two sonars.

Then, when it is determined for the first time that the identical obstacle is detected by plural sonars, the processing goes to step S125h. When the identical obstacle is not detected by plural sonars or when the identical obstacle has been already detected by the plural sonars, the processing goes to step S125i to be described later.

In step S125h, the acceleration suppression activation determination unit 10G acquires the distance from the current location of the vehicle MM to an obstacle as a plural-number detection distance Lc, and the processing goes to step S125i. In other words, the plural-number detection distance Lc is a distance from the vehicle MM to the obstacle at the time point when the identical obstacle is detected by plural sonars.

In step S125i, the acceleration suppression activation determination unit 10G determines whether or not the detected obstacle has a decision level of Lv3 (high level) based on the first-time detection distance La, the height determination distance Lb, the plural-number detection distance Lc, and the distance difference Ld. It is to be noted that initial values of the first-time detection distance La, the height determination distance Lb, the plural-number detection distance Lc, and the distance difference Ld are set such that La=0 cm, Lb=0 cm, Lc=0 cm, and Ld=500 cm, respectively.

Then, in step S125i, the acceleration suppression activation determination unit 10G determines that the decision level of the detected obstacle is Lv3 (high level), when the first-time detection distance La is equal to or longer than a threshold TH13, the height determination distance Lb is equal to or longer than a threshold TH23, the plural-number detection distance Lc is equal to or longer than a threshold TH33, and the distance difference Ld is equal to or shorter than a threshold TH43.

FIG. 7 is a view illustrative of an example of the decision level determination threshold. In FIG. 7, a numerical unit is centimeter (cm). In the present embodiment, it is configured that the threshold TH13=350 cm, the threshold TH23=200 cm, the threshold TH33=300 cm, and the threshold TH43=200 cm.

Then, when it is determined that a condition of Lv3 is satisfied in step S125i, the processing goes to step S125j. The decision level of the detected obstacle is set to Lv3 (high), and the processing goes to step S125p to be described later. On the other hand, when it is determined that the condition of Lv3 is not satisfied in step S125i, the processing goes to step S125k.

In step S125k, the acceleration suppression activation determination unit 10G determines whether or not the decision level of the detected obstacle is Lv2 (medium level) based on the first-time detection distance La, the height determination distance Lb, the plural-number detection distance Lc, and the distance difference Ld. Herein, it is determined that the decision level of the detected obstacle is Lv2 (medium level), when the first-time detection distance La is equal to or longer than a threshold TH12, the height determination distance Lb is equal to or longer than a threshold TH22, the plural-number detection distance Lc is equal to or longer than a threshold TH32, and the distance difference Ld is equal to or shorter than a threshold TH42. In the present embodiment, as illustrated in FIG. 7, it is configured that the threshold TH12=300 cm, the threshold TH22=150 cm, the threshold TH32=230 cm, and the threshold TH42=250 cm.

Then, when it is determined that a condition of Lv2 is satisfied in step S125k, the processing goes to step S125l. The decision level of the detected obstacle is set to Lv2 (medium), and the processing goes to step S125p to be described later. On the other hand, when it is determined that the condition of Lv2 is not satisfied in step S125k, the processing goes to step S125m.

In step S125m, the acceleration suppression activation determination unit 10G determines whether or not the decision level of the detected obstacle is Lv1 (low level) based on the first-time detection distance La, the height determination distance Lb, the plural-number detection distance Lc, and the distance difference Ld. Herein, it is determined that the decision level of the detected obstacle is Lv1 (low level), when the first-time detection distance La is equal to or longer than a threshold TH11, the height determination distance Lb is equal to or longer than a threshold TH21, the plural-number detection distance Lc is equal to or longer than a threshold TH31, and the distance difference Ld is equal to or shorter than a threshold TH41. In the present embodiment, as illustrated in FIG. 7, it is configured that the threshold TH11=250 cm, the threshold TH21=100 cm, the threshold TH31=80 cm, and the threshold TH41=300 cm.

Then, when it is determined that a condition of Lv1 is satisfied in step S125m, the processing goes to step S125n. The decision level of the detected obstacle is set to Lv1 (low), and the processing goes to step S125p to be described later. On the other hand, when it is determined that the condition of Lv1 is not satisfied in step S125m, the processing goes to step S125o. The decision level of the detected obstacle is set to Lv0 (null), and the decision level determination process ends.

In step S125p, the acceleration suppression activation determination unit 10G determines whether or not the obstacle is lost in a short distance (for example, within a range of 50 cm ahead in the travel direction of the vehicle MM). In other words, it is determined that whether or not the state where there is an obstacle ahead in the travel direction of the vehicle MM can be kept, even when the distance between the vehicle MM and the obstacle is shorter than a short distance threshold (50 cm). Then, when it is determined that the obstacle is lost in the short distance, the processing goes to step S125o. When it is determined that the obstacle is not lost in the short distance, the processing goes to step S125q.

In step S125q, the acceleration suppression activation determination unit 10G sets the decision level of the detected obstacle to Lv3 (high), and the decision level determination process ends. In other words, in the processing from step S125i to step S125n, when the obstacle having the decision level set to either Lv2 or Lv1 is not lost in the short distance, the decision level is raised to Lv3, whereas when the obstacle is lost in the short distance, the decision level is lowered to Lv0.

In such a manner, in step S125, the decision level is set based on the information on the obstacle existing ahead in the travel direction of the vehicle MM. The decision level of the obstacle is updated to a final decision level in consideration of a travel state or drive state of the vehicle MM to be described later. In the present embodiment, when the ignition switch 8 is turned off, the decision level of the obstacle (immediately before the ignition is turned off), and the distance between the vehicle MM and the obstacle is stored the in decision level storage unit 10K. Then, when the ignition switch 8 is turned on next time (immediately after the ignition is turned on), the decision level stored in the decision level storage unit 10K is used to carry out the acceleration suppression control to avoid the obstacle.

In other words, when immediately after the ignition being turned on is determined in step S115 of FIG. 4, in step S128, the acceleration suppression activation determination unit 10G carries out a decision level acquisition process of acquiring the decision level of the obstacle stored in the decision level storage unit 10K.

Figure 8:
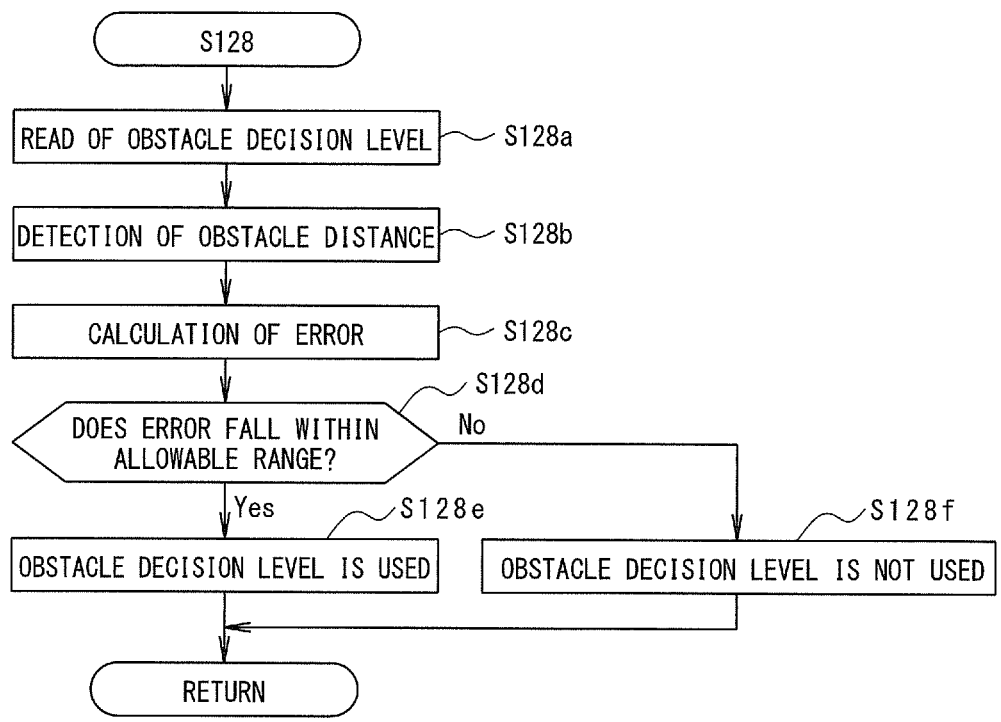
FIG. 8 is a flow chart illustrative of a decision level acquisition process procedure.

FIG. 8 is a flow chart illustrative of a decision level acquisition process procedure to be carried out in step S128.

Firstly, in step S128a, the acceleration suppression activation determination unit 10G reads a stored level of the obstacle stored in the decision level storage unit 10K and the distance between the vehicle MM and the obstacle, and the processing goes to step S128b.

In step S128b, the acceleration suppression activation determination unit 10G detects the distance between the vehicle MM and the obstacle based on the surrounding environment recognition information recognized in the above step S110. It is to be noted that, in one embodiment, at least two sonars that have detected the obstacle immediately before the ignition is turned off are configured to detect the distance between the vehicle MM and the obstacle.

Next, in step S128c, the acceleration suppression activation determination unit 10G calculates an error between the distance between the vehicle MM and the obstacle (obstacle distance storage value) read in the above step S128a and the distance between the vehicle MM and the obstacle (obstacle distance detection value) detected in the above step S128b.

Then, in step S128d, the acceleration suppression activation determination unit 10G determines whether or not the error calculated in step S128c falls within an allowable range. Herein, when the error falls within a range of +−30 cm, it is determined that the error falls within such an allowable range.

Then, when it is determined that the error falls within such an allowable range, the processing goes to step S128e and determines that the decision level stored in the decision level storage unit 10K is valid. In this case, the decision level stored in the decision level storage unit 10K is used as a decision level of the obstacle existing ahead in the travel direction of the vehicle MM, and the decision level acquisition process ends.

On the other hand, when it is determined in step S128d that the error falls out of an allowable range, the processing goes to step S128f and determines that the decision level stored in the decision level storage unit 10K is invalid. In this case, the decision level of the obstacle existing ahead in the travel direction of the vehicle MM is set to an initial state (Lv0), and the decision level acquisition process ends.

Referring back to FIG. 4, in step S130, the acceleration suppression activation determination unit 10G acquires the speed of the vehicle MM from the vehicle speed operation unit 10B.

Next, in step S140, the acceleration suppression activation determination unit 10G determines whether or not the vehicle speed acquired in the above step S130 is lower than a predefined vehicle speed threshold (for example, 15 km/h). Then, when the vehicle speed is lower than the vehicle speed threshold, it is determined that the vehicle MM is travelling at a low speed, and then the processing goes to step S150. When the vehicle speed is equal to or higher than the vehicle speed threshold, it is determined that the acceleration suppression control does not have to be activated, and the processing goes to step S145.

In step S145, the acceleration suppression activation determination unit 10G sets an acceleration suppression activation determination result to acceleration suppression activation condition non-satisfied (the decision level of the obstacle=Lv0), and the processing goes to step S190 to be described later.

In step S150, the acceleration suppression activation determination unit 10G acquires the brake pedal manipulation information from the brake pedal manipulation information operation unit 10E, and the processing goes to step S160.

In step S160, the acceleration suppression activation determination unit 10G determines whether there is a presence or absence of the brake pedal manipulation based on the brake pedal manipulation information acquired in the above step S150. Then, when the absence of the brake pedal manipulation is determined, the processing goes to step S170. When the presence of the brake pedal manipulation is determined, the processing goes to step S145.

In step S170, the acceleration suppression activation determination unit 10G acquires the accelerator manipulation amount from the accelerator manipulation amount operation unit 10F, and the processing goes to step S180.

In step S180, the acceleration suppression activation determination unit 10G determines whether or not the accelerator manipulation amount acquired in step S170 is equal to or larger than a predefined accelerator manipulation amount threshold. Herein, the accelerator manipulation amount threshold is set to, for example, a manipulation amount corresponding to 50% the accelerator opening degree of the accelerator pedal 19. Then, when the accelerator manipulation amount is equal to or larger than the accelerator manipulation amount threshold, processing goes to step S182. When the accelerator manipulation amount is smaller than the accelerator manipulation amount threshold, processing goes to step S145.

In step S182, the acceleration suppression activation determination unit 10G operates an approach degree D to the obstacle. Herein, the distance between the vehicle MM and the obstacle is set as the approach degree D.

Next, in step S184, the acceleration suppression activation determination unit 10G determines whether or not the approach degree D calculated in the above step S182 is equal to or higher than a predefined approach degree threshold. In this situation, since the distance between the vehicle MM and the obstacle is regarded as the approach degree D, when the approach degree D is equal to or smaller than a predefined value (for example, 3.5 meters), it is determined that the approach degree D is equal to or higher than the predefined approach degree threshold.

Then, when the approach degree D is equal to or higher than the approach degree threshold, it is determined that the acceleration suppression control should be carried out, and the processing goes to step S186. When the approach degree D is lower than the approach degree threshold, it is determined that it is sufficient to do an avoidance action from the obstacle, and the processing goes to step S122.

It is to be noted that the approach degree D does not have to be a distance itself between the vehicle MM and the obstacle. For example, a risk potential such as a Time To Contact TTC in which the vehicle MM arrives at the current location of the obstacle can be used for a value of the approach degree D.

In step S186, the acceleration suppression activation determination unit 10G determines that the acceleration suppression activation condition is satisfied, the decision level determined in step S125 is set as an acceleration suppression activation determination result, and the processing goes to step S190.

In step S190, the acceleration suppression activation determination result determined in either the above step S145 or step S186 is output to the acceleration suppression amount operation unit 10H and is also stored in the decision level storage unit 10K, and the acceleration suppression activation determination process ends.

Thus, the decision level is set depending on the type of obstacle based on the first-time detection distance La, the height determination distance Lb, the plural-number detection distance Lc, and the distance difference Ld that is a difference between the first-time detection distance La and the height determination distance Lb. In addition, the decision level storage unit 10K is configured to store the decision level that has been set most recently before the ignition is turned off and the distance between the vehicle MM and the obstacle that has been detected most recently before the ignition is turned off. Immediately after the ignition is turned on, by comparing the obstacle distance storage value with the obstacle distance detection value, the validity of the decision level stored in the decision level storage unit 10K is determined to be used for the acceleration suppression control to avoid the obstacle.

FIG. 9A to FIG. 9C are views illustrative of differences between the obstacle distance detection result and the height determination result depending on the type of obstacle. In FIG. 9A to FIG. 9C, in FIG. 9A, the obstacle is a wall, in FIG. 9B, the obstacle is another vehicle, and in FIG. 9C, the obstacle is an edge stone.

As understood from FIG. 9A to FIG. 9C, the first-time detection distance La, the height determination distance Lb, and the distance difference Ld between the first-time detection distance La and the height determination distance Lb are varied depending on the type of obstacle. In the case of a wall, the existence of the obstacle and the obstacle that is tall can be detected from a comparatively longer distance. In contrast, in the case of another vehicle, the first-time detection distance La tends to be shorter than that of the wall. Besides, in the case of another vehicle, since it has a similar size to the vehicle MM and its shape is complicated, it is necessary to get closer to another vehicle car to some extent until another vehicle is recognized as a tall obstacle. In other words, the distance difference Ld between the first-time detection distance La and the height determination distance Lb of another vehicle becomes longer than that of a wall.

In contrast, in the case of an edge stone, even if an obstacle existing ahead in the travel direction of the vehicle MM is detected, it is not recognized as a tall obstacle. Also, in the case of an edge stone, when the vehicle MM moves closer within a short distance (for example, 50 cm), the obstacle detection is not enabled because it falls out of the detection range of the sonar (lost in short distance).

Further, as to the obstacle having a width such as a wall or another vehicle, plural sonars are configured to detect the obstacle. However, as to a thin object (such as a pole or a pylon), plural sonars are not configured to detect the obstacle. Furthermore, in the case of a natural thing such as grass, the detection performance is poor and the reflection wave tends to be hardly received in a stable manner, unless the vehicle MM gets closer within 1 meter, for example.

Figure 10:
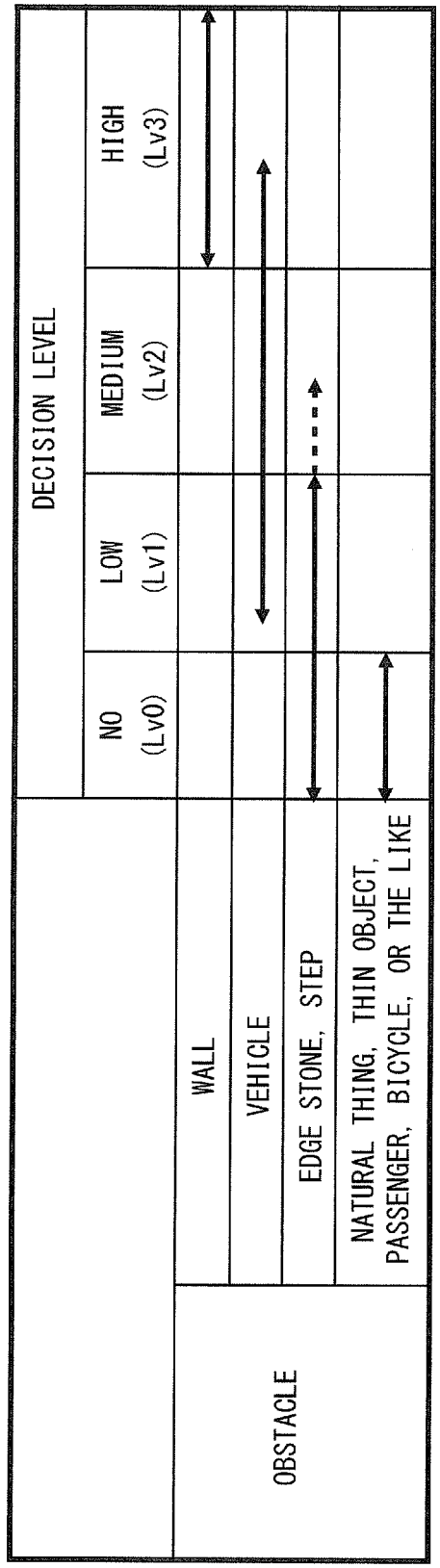
FIG. 10 is a view illustrative of a relationship between the type of the obstacle and a decision level.

As described above, by utilizing the tendency that the first-time detection distance La or the height determination distance Lb are varied depending on the type of the obstacle and setting a threshold of each value as illustrated in FIG. 7, it is made possible to set the decision level depending on the type of the obstacle, as illustrated in FIG. 10.

In other words, when the obstacle is a wall, the decision level is Lv3 that is a maximum level. When the obstacle is another vehicle, the decision level varies Lv1 to Lv3 depending on the shape and size. In addition, when the obstacle is not tall such as an edge stone or a step, the decision level is Lv0. However, when a step has a complicated shape or steps are aligned back and forth, its height has to be determined. Hence, the decision level can be Lv1 until it is lost in a short distance. Further, as to the step under a special environment such as a service station or a factory, the first-time detection and the height determination can be made easily. In this case, the decision level can be Lv2 until it is lost in a short distance. Furthermore, in the case of a natural thing, a thin object, a walker, a bicycle, or the like, the decision level is Lv0.

In addition, in the present embodiment, a control manner of the acceleration suppression control is changed depending on the decision level of the obstacle (the type of the obstacle). The acceleration suppression amount operation unit 10H and the brake control amount operation unit 10J are configured to make such a change in the control manner, upon receipt of the decision level of the obstacle that has been set by the acceleration suppression activation determination unit 10G.

Figure 11:
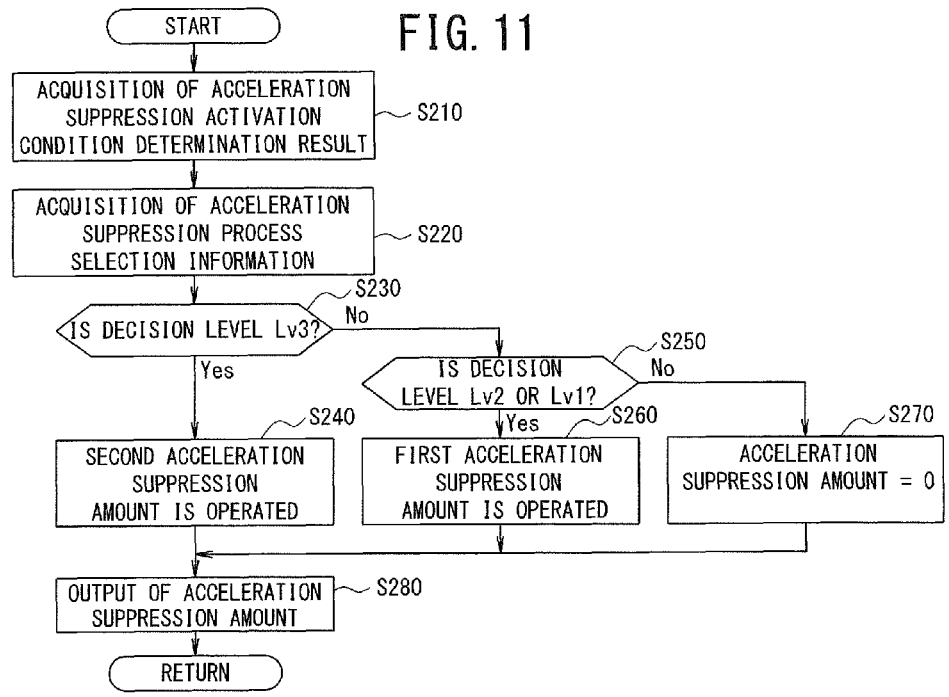
FIG. 11 is a flow chart illustrative of a process procedure of an acceleration suppression amount operation unit.

The acceleration suppression amount operation unit 10H is configured to carry out the acceleration suppression amount operation process as illustrated in FIG. 11 at every predefined sampling time.

Firstly, in step S210, the acceleration suppression amount operation unit 10H acquires the decision level of the obstacle as an acceleration suppression activation determination result from the acceleration suppression activation determination unit 10G, and processing goes to step S220.

In step S220, the acceleration suppression amount operation unit 10H acquires acceleration suppression process selection information. Herein, the acceleration suppression process selection information is an accelerator manipulation amount acquired from the accelerator manipulation amount operation unit 10F.

Next, in step S230, the acceleration suppression amount operation unit 10H determines whether or not the decision level of the obstacle acquired in the above step S210 is Lv3. Then, when the decision level is Lv3, the processing goes to step S240. When the decision level is not Lv3, the processing goes to step S250 to be described later.

In step S240, the acceleration suppression amount operation unit 10H operates a second acceleration suppression amount to strongly activate the drive force limit control, and the processing goes to step S280 to be described later. To be specific, the acceleration suppression amount is operated such that the throttle opening degree (acceleration instruction value) is not larger than a second limit value (for example, 0%) based on the accelerator manipulation amount acquired in the above step S220.

In step S250, the acceleration suppression amount operation unit 10H determines whether or not the decision level of the obstacle acquired in the above step S210 is either Lv2 or Lv1. Then, when the decision level is either Lv2 or Lv1, the processing goes to step S260.

In step S260, the acceleration suppression amount operation unit 10H operates a first acceleration suppression amount to weakly activate the drive force limit control, and the processing goes to step S280 to be described later. To be specific, the acceleration suppression amount is operated such that the throttle opening degree (acceleration instruction value) is not larger than a first limit value (for example, 25%) based on the accelerator manipulation amount acquired in the above step S220.

In addition, when it is determined in step S250 that the decision level is Lv0, the processing goes to step S270. The acceleration suppression amount is set with "0" so that the drive force limit control should not be activated, and the processing goes to step S280.

In step S280, the acceleration suppression amount operation unit 10H outputs the acceleration suppression amount that has been operated to the target throttle opening degree operation unit 10I, and the acceleration suppression amount operation process ends.

The target throttle opening degree operation unit 10I receives the acceleration suppression amount from the acceleration suppression amount operation unit 10H and the accelerator manipulation amount from the accelerator manipulation amount operation unit 10F. Then, the target throttle opening degree $\theta^*$ is obtained from a following expression, for example.

$$\theta^* = \theta1 - \Delta\theta$$

where $\theta1$ is a throttle opening degree depending on the accelerator manipulation amount, and $\Delta\theta$ is an acceleration suppression amount.

The target throttle opening degree operation unit 10I outputs the throttle opening degree $\theta^*$ that has been operated to the engine controller 16, and the engine controller 16 controls the engine that is a drive source so that the throttle opening degree should be the target throttle opening degree $\theta^*$.

Next, the process to be carried out by the brake control amount operation unit 10J will be described.

Figure 12:
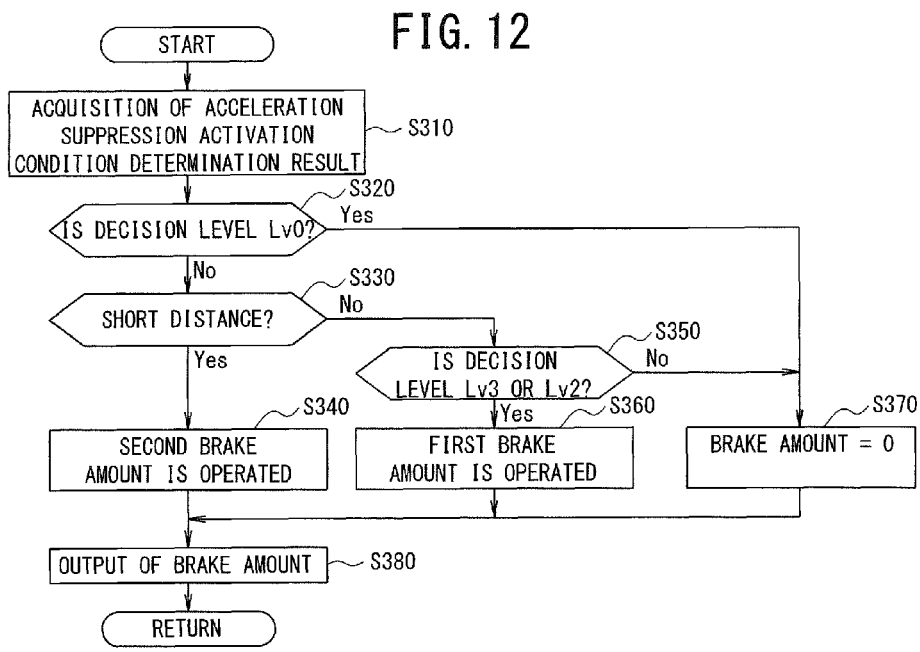
FIG. 12 is a flow chart illustrative of a process procedure of a brake control amount operation unit.

FIG. 12 is a flow chart illustrative of a brake control amount operation process procedure to be carried out by the brake control amount operation unit 10J.

Firstly, in step S310, the brake control amount operation unit 10J acquires the decision level of the obstacle as an acceleration suppression activation determination result from the acceleration suppression activation determination unit 10G, and processing goes to step S320.

In step S320, the brake control amount operation unit 10J determines whether or not the acceleration suppression activation determination result acquired from the acceleration suppression activation determination unit 10G is the acceleration suppression activation condition non-satisfied, that is to say, whether or not the decision level is Lv0. Then, when it is determined that the decision level is not Lv0, the processing goes to step S330. When it is determined that the decision level is Lv0, the processing goes to step S370 to be described later.

In step S330, the brake control amount operation unit 10J determines whether or not the distance between the vehicle MM and the obstacle falls within a short distance (for example, 50 cm). Then, when it falls within a short distance, the processing goes to step S340. When it does not fall within a short distance, the processing goes to step S350 to be described later.

In step S340, the brake control amount operation unit 10J operates a second brake amount to strongly activate the brake force control, and the processing goes to step S380 to be described later. To be specific, the brake amount is operated such that the brake force (brake force instruction value) is the second brake force (corresponding to, for example, 0.5 G).

In step S350, the brake control amount operation unit 10J determines whether or not the decision level of the obstacle acquired in the above step S310 is either Lv3 or Lv2. Then, when the decision level is either Lv3 or Lv2, the processing goes to step S360.

In step S360, the brake control amount operation unit 10J operates the first brake amount to weakly activate the brake force control, and the processing goes to step S380 to be described later. To be specific, the brake force is operated such that the brake force (brake force instruction value) is the first brake force (corresponding to 0.25 G, for example).

In addition, when it is determined in step S350 that the decision level is Lv0, the processing goes to step S370. The control amount is set to "0" so that the brake force control should not be activated, and the processing goes to step S380.

In step S380, the brake control amount operation unit 10J outputs the control amount that has been operated to the brake controller 14, and the brake control amount operation process ends.

The brake controller 14 controls the brake force such that the brake force generated by the brake device 12 should be a brake force operated by the brake control amount operation unit 10J.

Operation

Figure 13:
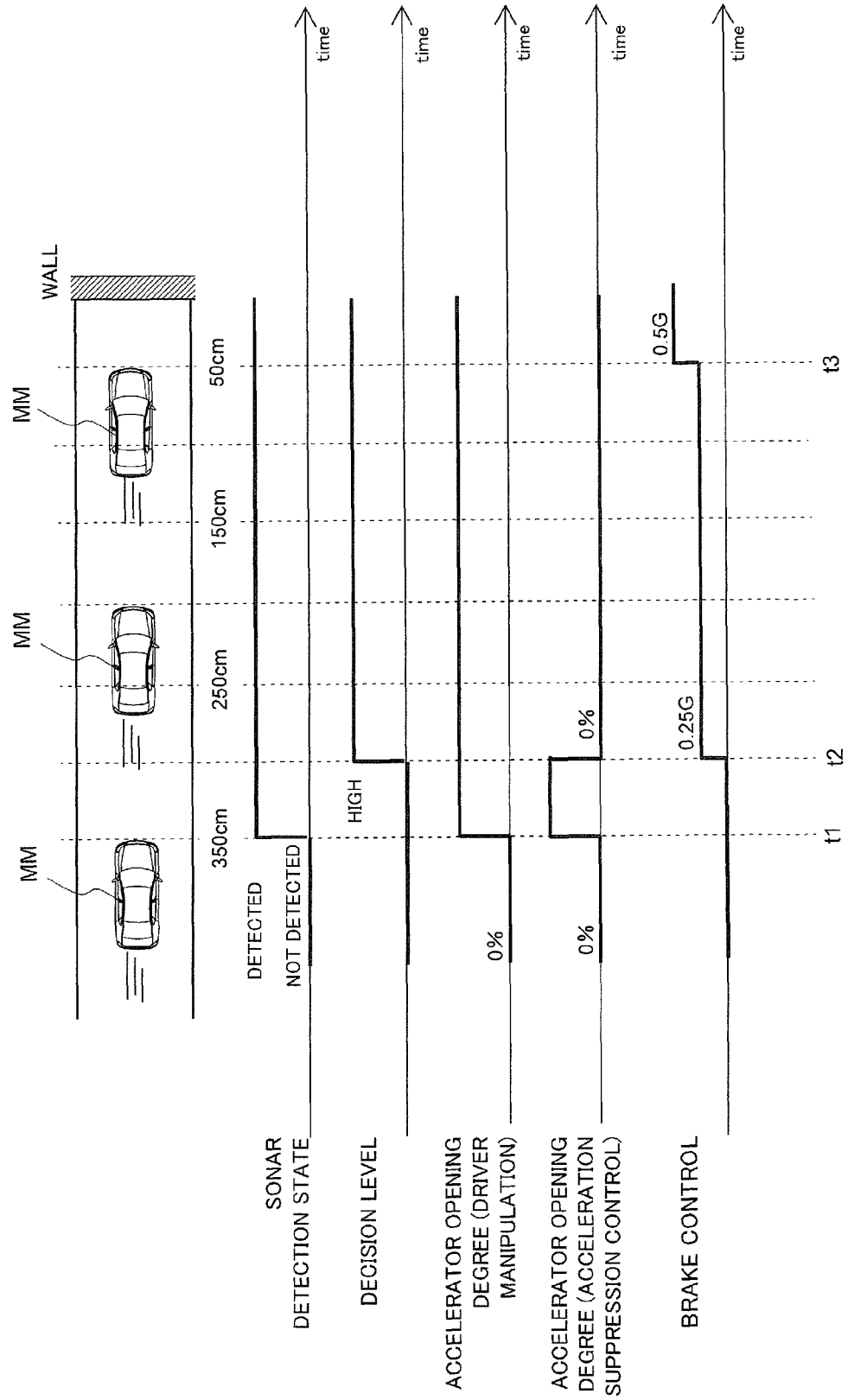
FIG. 13 is a time chart illustrative of an operation (in the case of a wall) in one embodiment of the present disclosure.

Next, an operation in the present embodiment will be described. FIG. 13 is a time chart illustrative of an example of the operation while the vehicle MM is traveling at a low speed under 15 km/h toward a wall. When the travel controller 10 detects a wall for the first time as an obstacle existing ahead in the travel direction of the vehicle MM at a location that is 350 cm short of the wall (at a time point t1) (step S125a: Yes, step S125b: Yes in FIG. 5), the distance between the vehicle MM and the obstacle at this time is acquired as the first-time detection distance La (step S125c). In other words, the first-time detection distance La is 350 cm.

In this situation, when the obstacle is detected by two sonars 1b and 1c in the middle of the plural sonars 1a to 1d, the distance between the vehicle MM and the obstacle at the time point t1 is acquired as the plural-number detection distance Lc (step S125h). In other words, the plural-number detection distance Lc is 350 cm.

In this situation, when no reflection wave from either top or bottom of the obstacle is received and thus it cannot be determined that the detected obstacle is a tall obstacle, the height determination distance Lb cannot be acquired. Hence, the decision level of the obstacle cannot be determined. Accordingly, at the time point t1, the decision level remains as an initial state (Lv0).

Therefore, when a driver makes an accelerator operation at the time point t1, the drive force limit control is not carried out (step S250: No in FIG. 11), and the engine is controlled such that the throttle opening degree depends on the driver's accelerator manipulation amount. In addition, since the decision level is Lv0, the brake force control is not carried out, either (step S350: No in FIG. 12).

Subsequently, when the reflection wave having two peaks is received at a location that is 300 cm short of the wall (at a time point t2) as illustrated in the lower section of FIG. 6B, it is determined that the detected obstacle is a tall obstacle that is as tall as the vehicle or taller than the vehicle MM (step S125d: Yes). Then, the distance between the vehicle MM and the obstacle at this time is acquired as the height determination distance Lb (step S125e). In other words, the height determination distance La is 300 cm. Thus, the distance difference Ld between the first-time detection distance La and the height determination distance Lb is 50 cm (step S125f).

Thus, the first-time detection distance La is equal to or longer than the threshold TH13 (=350 cm), the height determination distance Lb is equal to or longer than the threshold TH23 (=200 cm), the plural-number detection distance Lc is equal to or longer than the threshold TH33 (=300 cm), the distance difference Ld is equal to or shorter than the threshold TH43 (=200 cm) (step S125i: Yes). Therefore, it is determined at the time point t2 that there is a high possibility that the detected obstacle is a wall, and the decision level is set to Lv3 (step S125j).

Thus, at this time point t2, the acceleration suppression amount is operated so that the throttle opening degree (acceleration instruction value) should not be higher than 0% (step S240), and the engine is controlled based on the acceleration suppression amount that has been operated. Accordingly, the throttle opening degree is limited to 0%. Thus, by activating the strong drive force limit control, the acceleration of the vehicle MM is suppressed with certainty. In addition, since the decision level is Lv3, (step S350: Yes), the weak brake force control for the purpose of warning is activated (step S360). Accordingly, the brake force corresponding to 0.25 G is generated, so that the vehicle speed can be decreased.

Still, when the driver continues the accelerator operation and the vehicle MM reaches a location that is 50 cm short of the wall at a time point t3 (step S330: Yes), the travel controller 10 activates the strong brake force control for the purpose of avoiding a contact with the wall (step S340). Accordingly, the brake force corresponding to 0.5 G is generated.

In this manner, when it is determined that the decision level of the obstacle is Lv3, the throttle opening degree is limited to 0%, and in addition, the brake force corresponding to 0.25 G is generated. Further, when the vehicle MM approaches at a short distance (less than 50 cm) from the obstacle, the brake force corresponding to 0.5 G is generated.

Thus, even if a driver mistakenly manipulates between the accelerator pedal and the brake pedal in front of the wall, the acceleration of the vehicle MM is suppressed, so that a contact with the wall can be prevented.

When a driver turns off the ignition switch 8 while the vehicle MM is in a stop state, the decision level storage unit 10K is configured to store the decision level that has been set most recently before the ignition switch 8 is turned off, and the distance between the vehicle MM and the obstacle that has been set most recently before the ignition switch 8 is turned off.

In other words, when the driver turns off the ignition switch 8 while the vehicle MM is in a stop state at a location that is 50 cm short of the wall, the decision level storage unit 10K stores the decision level=Lv3 and the obstacle distance store value=50 cm.

Figure 14:
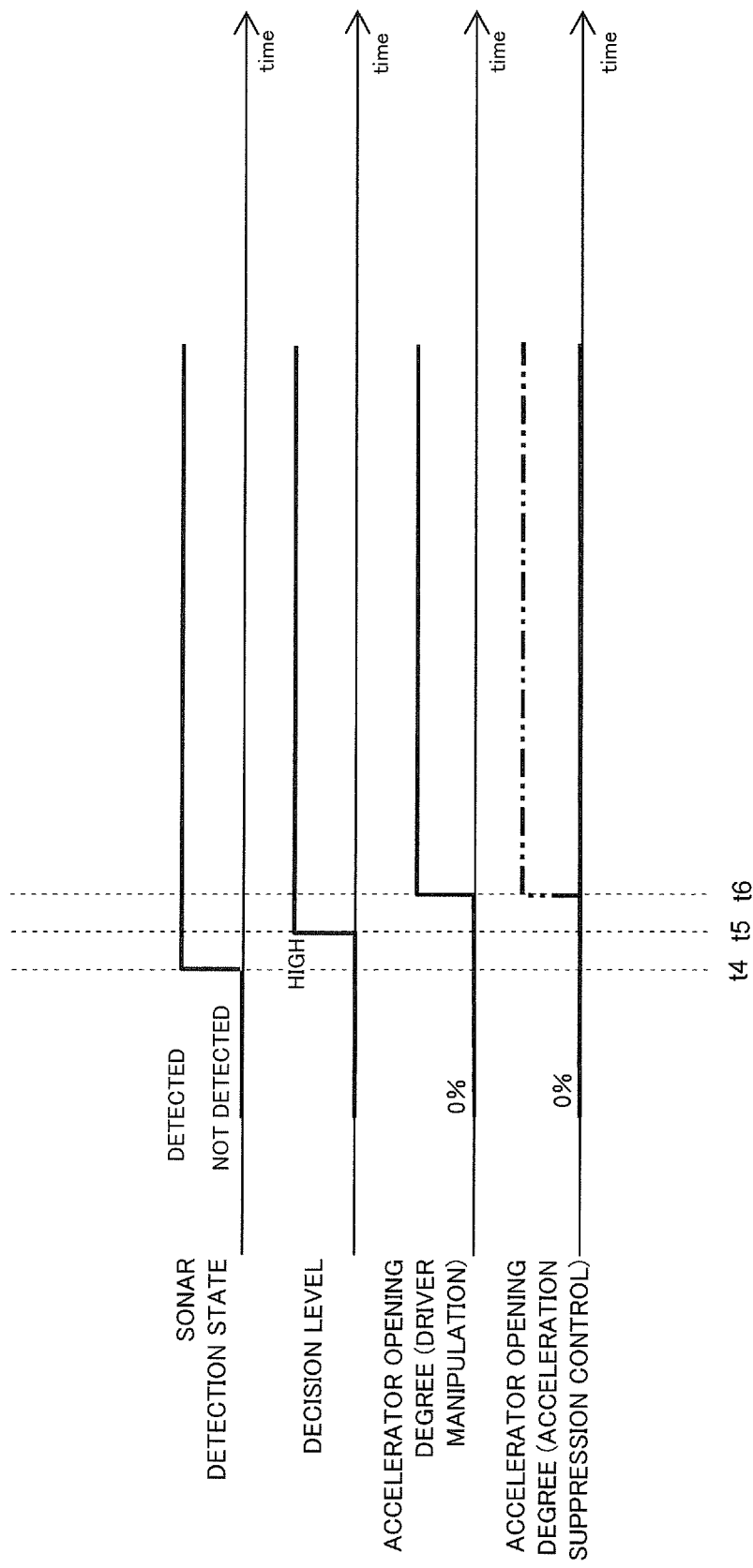
FIG. 14 is a time chart illustrative of an operation (when ignition is turned on) in one embodiment of the present disclosure.

Then, when the driver turns on the ignition switch 8 at a time point t4 of FIG. 14 (step S115: Yes), the decision level of the obstacle stored in the decision level storage unit 10K is read (step S128a of FIG. 8). Also, in this situation, the sonars 1a to 1d detect the distance to the obstacle existing ahead in the travel direction of the vehicle MM (step S128b).

Since the parked location of the vehicle MM while the ignition is off is not changed, when the obstacle existing ahead is a wall, the distance to the wall detected when the ignition is turned on is equal to the distance stored in the decision level storage unit 10K. Thus, since an error between the detection value and the storage value falls within an allowable range (step S128d: Yes), it is determined at a time point t5 immediately after the ignition is turned on that the decision level stored in the travel controller 10 is valid, the obstacle existing ahead in the travel direction is assumed to be a wall, and the decision level is set to Lv3 (step S128e).

Thus, when the engine starts at a time point t6 and the driver makes an accelerator manipulation almost at the same time, the throttle opening degree is limited to 0% by the drive force limit control. In other words, when the driver makes an accelerator manipulation to move backward with the shift position being set at the D range, in the situation where there is a wall ahead the vehicle MM, the acceleration of the vehicle MM can be suppressed with certainty.

In the present embodiment, however, when a method of determining the decision level of the obstacle by using the first-time detection distance La and the height determination distance Lb that have been detected while the vehicle MM is approaching the obstacle is used, the decision level of the obstacle cannot be determined from the information on the obstacle existing ahead that has been detected in a parking state at the time when the ignition is turned on.

However, the decision level of the obstacle stored in the decision level storage unit 10K makes it possible to understand the decision level of the obstacle promptly and appropriately at the time of turning on the ignition. Therefore, suited acceleration suppression control can be made.

Figure 15:
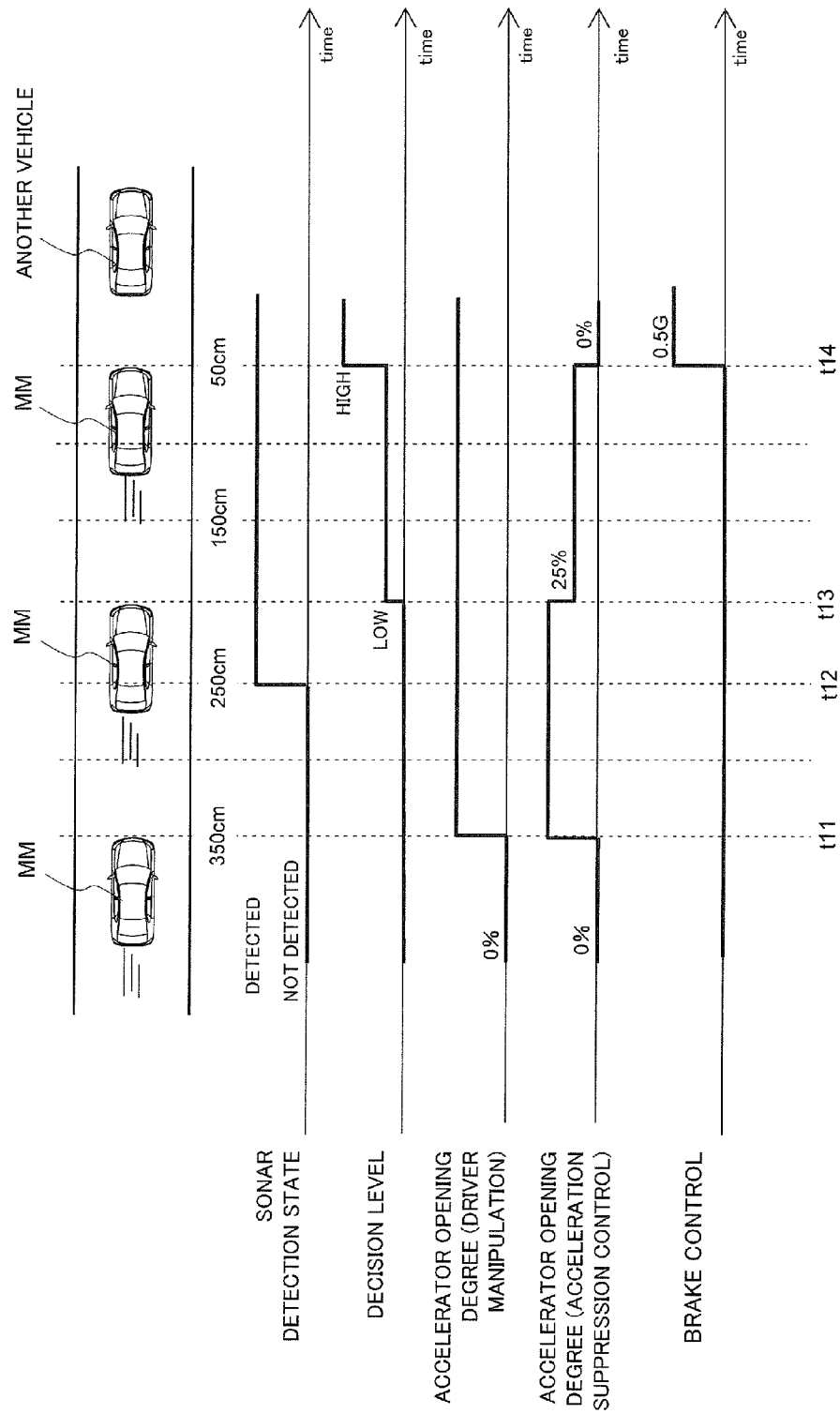
FIG. 15 is a time chart illustrative of an operation (in the case of another vehicle) in one embodiment of the present disclosure.

Next, the case where the obstacle existing ahead in the travel direction of the vehicle MM is another vehicle will be described by referring to FIG. 15.

While the vehicle MM is travelling at a low speed without detecting another vehicle ahead in the travel direction of the vehicle MM, when a driver makes an accelerator manipulation at a location 350 cm from another vehicle (at a time point t11), the engine is controlled such that the throttle opening degree depends on the driver's accelerator manipulation amount. Subsequently, at a time point t12, at a location that is 250 cm short of another vehicle, when such another vehicle existing ahead the vehicle MM is detected as an obstacle for the first time, the distance between the vehicle MM and the obstacle at this time is acquired as the first-time detection distance La (step S125c). In other words, the first-time detection distance La is 250 cm.

Also, when the obstacle is detected by two sonars 1b and 1c in the middle of the plural sonars 1a to 1d, the distance between the vehicle MM and the obstacle at the time point t12 is acquired as the plural-number detection distance Lc (step S125h). In other words, the plural-number detection distance Lc is 250 cm.

In this situation, when it cannot be determined that the detected obstacle is a tall one, the decision level remains as an initial state (Lv0) and the acceleration suppression control is not activated. Therefore, the engine control depending on the driver's accelerator manipulation amount continues.

Thus, as compared to the case where the obstacle is a wall as described above, in the case where the obstacle is another vehicle, its shape is complicated and the reflection waves of the transmission waves emitted by the sonars are not stable, and therefore, the first-time detection distance La and the height determination distance Lb tend to be shorter. In the example of FIG. 15, since the first-time detection distance La is longer than the threshold TH11 (=250 cm) and shorter than the threshold TH12 (=300 cm), even if the height determination is enabled at the time point t13 at a location that is 200 cm short of another vehicle and the height determination distance Lb (>=TH23) is acquired, neither the condition of Lv3 nor Lv2 is satisfied. In other words, in this case, the condition of Lv1 is satisfied (step S125*m*: Yes), it is determined that there is a high possibility that the detected obstacle is another vehicle, an edge stone, or a step, and then the decision level is set to Lv1 (step S125*n*).

Thus, the acceleration suppression amount is operated such that the throttle opening degree (acceleration instruction value) is not higher than 25% at a time point t13 (step S260), the engine is controlled based on the acceleration suppression amount that has been operated. Accordingly, the throttle opening degree is limited to 25%. Thus, the acceleration of the vehicle MM is suppressed by activating the weak drive force limit control. In addition, since the decision level is Lv1 (step S350: No), the brake force control is not activated (step S370).

Then, the driver continues the accelerator manipulation. When the vehicle MM moves to a location of a short distance that is 50 cm short of another vehicle at a time point t14, the travel controller 10 determines whether or not the obstacle is lost (step S125*p*). In this example of FIG. 15, the obstacle is another vehicle, and in order to maintain the state where the obstacle is detected even in the short distance (step S125*p*: Yes), the decision level of the obstacle is raised from Lv1 to Lv3 (step S125*q*). Accordingly, the travel controller 10 activates the strong drive force limit control to limit the throttle opening degree to 0% (step S240). In addition, since the vehicle MM moves to a location that is 50 cm short of another vehicle (step S330: Yes), the strong brake force control is activated for the purpose of avoiding a contact with another vehicle to generate the brake force corresponding to 0.5 G (step S340).

Then, when the driver turns off the ignition switch 8 in the state where the vehicle MM stops at a location that is 50 cm short of another vehicle, the distance between the vehicle MM and the obstacle and the decision level of the obstacle at that time point are stored in the decision level storage unit 10K.

Subsequently, another vehicle moves away while the ignition of the vehicle MM is off, there is no obstacle ahead the vehicle MM at the time of turning on the ignition. Accordingly, in this case, the distance to the obstacle detected at the time of turning on the ignition and the distance to the obstacle (another vehicle) stored in the decision level storage unit 10K are completely different from each other. In other words, an error between the detection value and the storage value falls out of an allowable range (step S128*d*: No), it is determined that the decision level stored in the decision level storage unit 10K is invalid.

Thus, before the decision level stored in the decision level storage unit 10K is used for the acceleration suppression control to the obstacle, the validity of the decision level is determined. Thus, as described above, in a case where an obstacle has moved away until the ignition is turned on after the ignition is turned off, the stored decision level is made invalid so that the inappropriate acceleration suppression control can be prevented.

Figure 16:
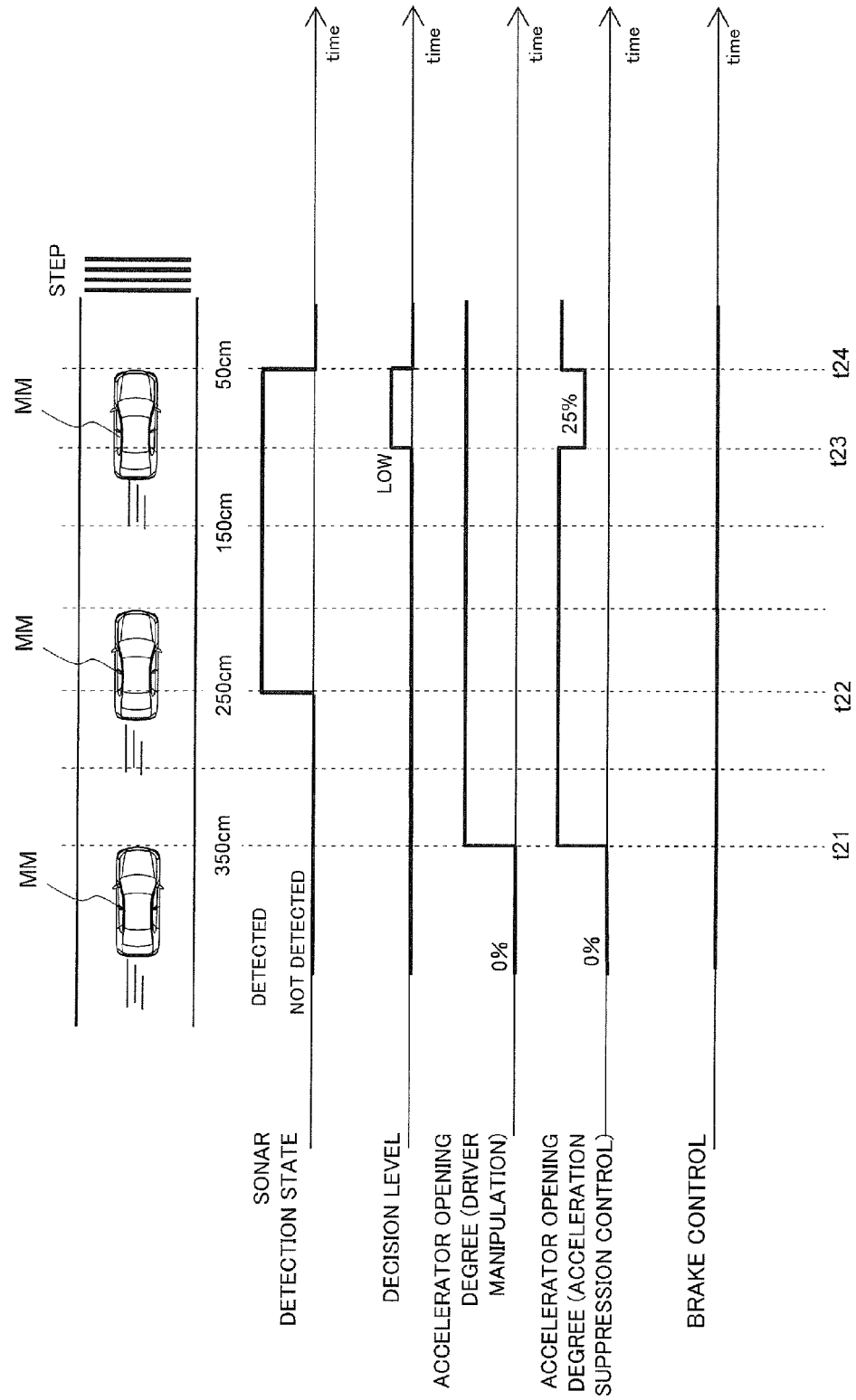
FIG. 16 is a time chart illustrative of an operation (in the case of a step) in one embodiment of the present disclosure.

In the case where the obstacle existing ahead in the travel direction of the vehicle MM is a step having a complicated shape or steps aligned back and forth, even if it is shorter than the vehicle MM and its size is originally too small for the height determination, the height determination is conducted in some cases. In such cases, the decision level is Lv1 until it is lost in a short distance. FIG. 16 is a time chart illustrative of an operation when a step having the decision level that can be Lv1 is detected as an obstacle.

As illustrated in FIG. 16, when the obstacle is detected for the first time at a time point t22 at a location that is 250 cm short of the step and the height is determined at a time point t22 at a location that is 100 cm short of the step, the condition of Lv1 is satisfied (step S125*m*: Yes). It is determined that there is a high possibility that the detected obstacle is another vehicle, an edge stone, or a step, and the decision level is set to Lv1 (step S125*n*).

Thus, at the time point t23, the acceleration suppression amount is operated so that the throttle opening degree (acceleration instruction value) should not be higher than 25% (step S260), and the engine is controlled based on the acceleration suppression amount that has been operated. Accordingly, the throttle opening degree is limited to 25%. In this manner, the acceleration of the vehicle MM is suppressed by activating the weak drive force limit control. In addition, since the decision level is Lv1 (step S350: No), the brake force control is not activated (step S370).

Subsequently, when the vehicle MM moves to a location of a short distance that is 50 cm short of the step at a time point t24, the step that is not tall falls out of a detectable range of the sonar, and an undetectable state occurs from the detectable state where the sonar is detecting the obstacle. Therefore, the travel controller 10 determines that the obstacle is lost in a short distance and lowers the decision level of the obstacle from Lv1 to Lv0 (step S125*o*). Accordingly, the travel controller 10 switches the drive force limit control to non-activation (step S270). In addition, the brake force control remains as non-activation (step S370).

Thus, it is determined that the decision level of the obstacle is Lv1 (or, Lv2). Even if it cannot be determined whether the obstacle is another vehicle, an edge stone, or a step, whether or not the obstacle is lost in a short distance is determined, so that the type of the obstacle can be determined. In other words, when the obstacle is not lost in a short distance, it is determined that there is a high possibility that the obstacle is another vehicle instead of a short obstacle such as an edge stone of a step and then the decision level is raised to Lv3. Hence, the strong drive force limit control and the strong brake force control can be activated together, so that a contact with another vehicle can be avoided appropriately.

On the other hand, when the obstacle having the decision level of Lv1 (or Lv2) is lost in a short distance, it is determined that there is a high possibility that the obstacle is an edge stone or a step and then the decision level is lowered to Lv0. Accordingly, both of the drive force limit control and the brake force control can be non-activated. Therefore, the brake force for avoiding a contact with an edge stone or a step is not generated in a short distance. Thus, it is possible to reduce troublesome feeling given to a driver.

Figure 17:
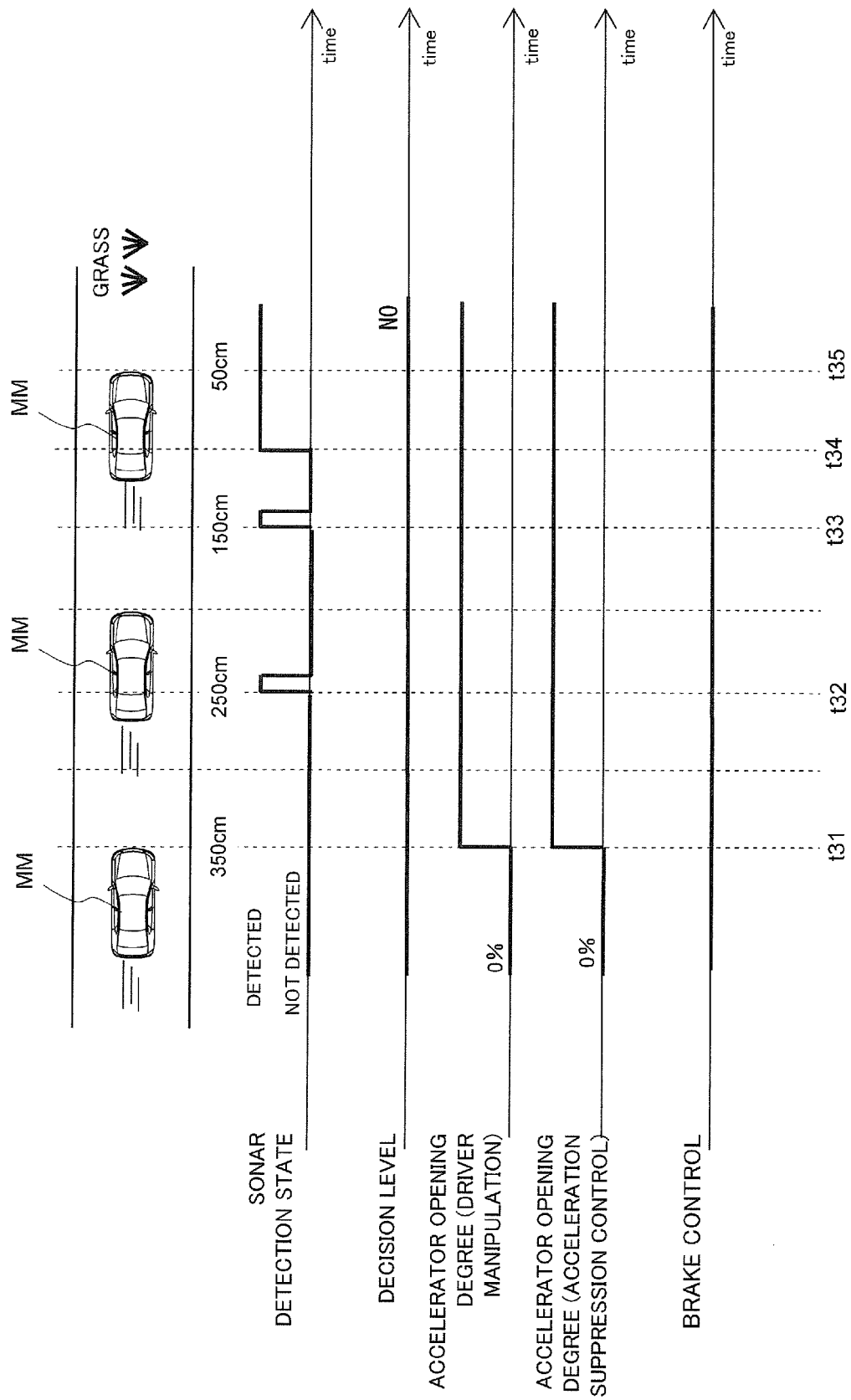
FIG. 17 is a time chart illustrative of an operation (in the case of grass) in one embodiment of the present disclosure.

Next, the case where the obstacle existing ahead in the travel direction of the vehicle MM is a natural thing such as grass will be described by referring to FIG. 17.

In the case where the obstacle is a natural thing such as grass, the strength of the reflection wave of the transmission wave from a sonar is not stable, and an unstable obstacle detection as indicated by a time point t33 or a time point t32 is made. Then, at a time point t34, at a location that is 100 cm short of the natural thing, stable reflection waves can be received and the first-time detection distance La=100 cm is obtainable.

In this case, since the first-time detection distance La is shorter than the threshold TH11 (=250 cm), the conditions of Lv3 to Lv1 are not satisfied (step S125m: No). It is determined that there is a high possibility that the detected obstacle is a natural thing or a thin object, and the decision level is set to Lv0 (step S125o). Thus, when a driver starts the accelerator manipulation at a time point t31 and continues such a manipulation, the engine is controlled such that the throttle opening degree depends on the driver's accelerator manipulation amount (step S270). Also, the brake force control is made to be non-activated (step S370).

Subsequently, when the vehicle MM comes to a location of a short distance that is 50 cm short of the natural thing at a time point t35, even if the state of detecting an obstacle by a sonar is maintained, the decision level of the obstacle maintains Lv0. Thus, neither the drive force limit control nor the brake force control is activated even in the short distance.

In this manner, when the strength of the reflection wave of the transmission wave emitted by the sonar is not stable and the first-time detection distance La is shorter than the threshold TH11 (=250 cm), the decision level is maintained in Lv0, although the height determination is made or the obstacle is not lost in a short distance. Therefore, it is possible to prevent activation of the acceleration suppression control to avoid a natural thing with certainty.

If a driver turns off the ignition switch 8 in the state where the vehicle MM stops at a location that is 50 cm short of the natural thing, the distance between the vehicle MM and the obstacle, and the decision level of the obstacle at that time are stored in the decision level storage unit 10K.

Then, when the ignition is turned on, the existence of the natural thing ahead the vehicle MM is detected by the sonars 1a to 1d. In this case, however, an error between the distance to the natural thing that is detected when the ignition is turned on and the distance to the natural thing stored in the decision level storage unit 10K falls within an allowable range (step S128d: Yes). Therefore, it is determined that the decision level stored in the decision level storage unit 10K is valid and the obstacle existing ahead is assumed to be a natural thing to set the decision level to Lv0 (step S128f).

Accordingly, when a driver makes an accelerator manipulation after the engine starts, even if an obstacle is detected ahead in the travel direction of the vehicle MM, such an obstacle is out of a target of the drive force limit control. The acceleration of the vehicle MM is not suppressed. In this manner, since the type of the obstacle existing ahead in the travel direction can be recognized properly at the time of turning on the ignition, it is possible to prevent unnecessary activation of the acceleration suppression control.

It is to be noted that in FIG. 3, the surrounding environment recognition sensor 1 corresponds to an in-vehicle sonar, and the acceleration suppression amount operation unit 10H and the brake control amount operation unit 10J correspond to an acceleration suppression controller. In addition, the decision level storage unit 10K corresponds to an obstacle type storage unit and an obstacle distance storage unit.

Further, in FIG. 5, step S125d corresponds to an obstacle height determination unit, step S125i to step S125q correspond to an obstacle type determination unit. Furthermore, in FIG. 8, step S128c to step S128f correspond to a validity determination unit.

Effects

In the present embodiment, the following effects are obtainable.

(1) The travel controller 10 is configured to determine the type of an obstacle based on the first-time detection distance La that is a distance between the vehicle MM and the obstacle when it is determined by the sonars 1a to 1d for the first time that the obstacle is existing, and the height determination distance Lb that is a distance between the vehicle MM and the obstacle when it is determined by the sonars 1a to 1d for the first time that the obstacle is a tall one. Then, when it is determined that the vehicle MM has approached the obstacle at an approach degree equal to or higher than a predefined approach degree based on the distance between the vehicle MM and the obstacle, the travel controller 10 is configured to carry out the acceleration suppression control in a control manner depending on a determination result of the obstacle type.

Accordingly, depending on the type of the obstacle, a condition of the magnitude of a control amount or activation/non-activation of the acceleration suppression control can be changed. Thus, it is possible to restrain annoying feeling, which is caused by strongly activating the acceleration suppression control to avoid, for example, a natural thing such as grass, from being given to a driver. Thus, appropriate acceleration suppression control depending on the type of the obstacle is enabled, so that the drive assist to avoid an obstacle can be given appropriately.

(2) The travel controller 10 is configured to determine that an obstacle existing ahead in the travel direction of the vehicle MM is a tall obstacle, upon receipt of a reflection wave having two strong peaks higher than a predefined obstacle detection threshold in a certain period, with respect to a single emission of transmission wave from each of the sonars 1a to 1d. Thus, when the transmission waves are emitted by the sonars toward a tall obstacle, the travel controller 10 is configured to utilize the fact that the transmission waves that have been emitted to the lower part of the obstacle by the sonar are received as a reflection wave reflected in the order of the obstacle and a road surface, and then returned, and a reflection wave emitted horizontally by the sonar, reflected directly, and then returned. Thus, it is possible to determine whether or not the detected obstacle is a tall obstacle, simply and adequately. In addition, as the determination of the height of the obstacle is enabled, it is possible to determine whether the obstacle is a wall or another vehicle as tall as the vehicle MM or taller than the vehicle MM. In addition, it is possible to determine whether the obstacle is an edge stone, a step, or the like that is shorter than the vehicle MM.

(3) The travel controller 10 is configured to determine a wall, a vehicle, an edge stone, a natural thing, as the type of the obstacle. Thus, since the substantial obstacle type is determined so that the acceleration suppression control changes, it is possible to carry out appropriate acceleration suppression control while restraining troublesome feeling given to the driver.

(4) The travel controller 10 is configured to set an obstacle decision level as an index to represent the type of the obstacle, and to set the obstacle decision level to a lower value in the order of a wall, a vehicle, an edge stone, and a natural thing. Thus, by setting the obstacle decision level to a lower value in the order of a wall, a vehicle, an edge stone, and a natural thing, it is possible to control the magnitude of the acceleration suppression control appropriately, such that a control manner of the acceleration suppression control is determined such that as the obstacle decision level is higher, the acceleration of the vehicle is suppressed with certainty.

(5) The travel controller 10 is configured to set the obstacle decision level to be higher, as the first detection distance La is longer. Accordingly, when a reflection wave of the transmission wave emitted by a sonar is stable and the obstacle detection is possible even from a distant location, a large-sized obstacle such as a wall can be determined.

(6) The travel controller 10 is configured to determine the type of the obstacle as a natural thing, when the first-time detection distance La is shorter than a natural thing detectable distance where reflection waves from the natural thing of the transmission waves emitted by the sonars 1a to 1d can be received stably. Thus, by utilizing the fact that the natural thing such as grass is poor in detection performance and the reflection wave of the transmission wave emitted by a sonar cannot be received stably, unless getting closer to a short distance, when the first-time detection distance La is shorter than the natural thing detectable distance, the travel controller 10 is configured to determine the type of the obstacle as a natural thing. Accordingly, such a detected obstacle can be recognized as a natural thing appropriately.

(7) The travel controller 10 is configured to set the obstacle decision level to be higher, as the height determination distance Lb is longer. Accordingly, when the obstacle that is a tall obstacle can be detected even from a distant location, a large-sized obstacle having a simple shape such as a wall can be determined.

(8) The travel controller 10 is configured to set the obstacle decision level to be higher, as the distance Ld obtained by subtracting the height determination distance Lb from the first-time detection distance La is shorter. Accordingly, in a case where the first-time detection can be made relatively promptly but the height determination is difficult to be made depending on the surface processing of the obstacle or the road surface condition, such as a case where the obstacle that is a short obstacle (an edge stone and a step) has a surface that can easily reflect the transmission wave emitted by the sonar, the obstacle decision level can be set to low. Therefore, it is possible to restrain an erroneous determination that a short obstacle is a wall or another vehicle.

(9) The travel controller 10 is configured to set the obstacle decision level to be higher, as the plural-number detection distance Lc that is a distance between the vehicle MM and the obstacle is longer, when a reflection waves from the identical obstacle of the transmission waves emitted by at least two adjacent sonars are received for the first time. Accordingly, an erroneous detection of the obstacle can be prevented. In addition, as the obstacle decision level is set to be higher, when simultaneous detections made by plural sonars are possible even from a distant location, the probability of the obstacle detection when an obstacle is a wall can be improved.

(10) The travel controller 10 is configured to set the obstacle decision level to the maximum level, while the state where it is determined by the sonars 1a to 1d that an obstacle exists ahead in the travel direction of the vehicle MM is maintained, even when the distance between the vehicle MM and the obstacle is shorter than a predefined short distance threshold. Also, when the distance between the vehicle MM and the obstacle becomes shorter than the short distance threshold, and it is determined that the obstacle does not exist any longer from the state where it is determined by the sonars 1a to 1d that an obstacle exists ahead in the travel direction of the vehicle MM, the obstacle decision level is set to the minimum level. Thus, even if the vehicle MM moves closer to an obstacle in a short distance, when the obstacle can be detected by a sonar (when the obstacle is not lost in a short distance), the acceleration suppression control to avoid the obstacle can be activated with certainty. Also, even if the height determination is made on a short obstacle (an edge stone or a step) under a special environment and the obstacle decision level is set to be comparatively high, the obstacle decision level can be set to an appropriate one again by confirming that the obstacle is lost in the short distance.

(11) The travel controller 10 is configured to carry out the drive force limit control as the acceleration suppression control to avoid the obstacle, such that the acceleration instruction value depending on the accelerator pedal manipulation amount is limited to the acceleration limit value depending on the obstacle decision level as an upper limit. In this situation, the acceleration limit value is set to a smaller value, as the obstacle decision level is higher. Accordingly, the acceleration limit value of the drive force suppression control is set to be smaller to a wall or another vehicle, so that the acceleration suppression effect can be brought out sufficiently. Also, the acceleration limit value of the drive force limit control is set to be larger to an edge stone or a natural thing so as to permit the acceleration. Hence, it is possible to restrain annoying feeling, which is caused by strongly activating the acceleration suppression control, from being given to a driver.

(12) The travel controller 10 is configured to carry out the brake force control of generating the brake force onto the vehicle depending on the distance between the vehicle MM and the obstacle, as the acceleration suppression control to avoid the obstacle. In this situation, the brake force is set to a larger value, as the obstacle level is higher. Accordingly, the brake force generated by the brake force control is set to be larger to a wall or another vehicle, so that the acceleration suppression effect can be brought out sufficiently. Also, the brake force generated by the brake force control is set small to an edge stone or a natural thing so as to permit acceleration. Hence, it is possible to restrain uncomfortable feeling, which is caused by strongly activating the acceleration suppression control, from being given to a driver.

(13) The travel controller 10 is configured to store the type of the obstacle that has been determined based on the first detection distance La and the height determination distance Lb. Then, the travel controller 10 is configured to carry out the acceleration suppression control in a control manner according to the stored obstacle type based on the distance between the vehicle MM and the obstacle, when it is determined that the vehicle MM has approached the obstacle at an approach degree equal to or higher than a predefined approach degree, at the time of turning on the ignition. Thus, the decision level of the obstacle is stored, so that the stored decision level is used for the acceleration suppression control at the time of turning on the ignition. Therefore, like the case where the obstacle type is determined by use of the first detection distance La and the height determination distance Lb that have been detected while the vehicle MM is approaching an obstacle, even if the obstacle type cannot be determined from the information on the obstacle ahead in the travel direction that has been detected in a stop state, at the time of turning on the ignition, the type of the obstacle ahead the vehicle can be recognized correctly, and the drive assist to avoid the obstacle can be done appropriately.

(14) The travel controller 10 is configured to determine the validity of the stored obstacle type, and then to use it for the acceleration suppression control at the time of turning on the ignition. Accordingly, it is possible to improve the reliability of the drive assist to avoid the obstacle at the time of turning on the ignition.

(15) The travel controller 10 is configured to determine at the time of turning on the ignition that the stored obstacle type is valid, when a difference between the stored distance to the obstacle and the detected distance to the obstacle by the sonars 1a to 1d falls within an allowable range. Accordingly, in a case where the obstacle has moved away or has been changed to another one until the ignition is turned on after the ignition is turned off, the stored obstacle type can be considered invalid. Thus, it is possible to suppress the activation of inappropriate acceleration suppression control.

(16) The first-time detection distance La that is a distance between the vehicle MM and the obstacle when it is determined by the sonars 1a to 1d for the first time that the obstacle exists, and the height determination distance Lb that is a distance between the vehicle MM and the obstacle when it is determined by the sonars 1a to 1d for the first time that the obstacle is a tall one are detected. Based on the first-time detection distance La and the height determination distance Lb, the type of the obstacle is determined. Then, when it is determined that the vehicle has approached the obstacle at an approach degree equal to or higher than a predefined approach degree based on the distance between the vehicle MM and the obstacle, the acceleration suppression control is carried out in a control manner depending on the type of the obstacle that has been determined. Accordingly, depending on the type of the obstacle, it is possible to change the magnitude of the control amount or the condition of activation/non-activation of the acceleration suppression control. Thus, it is possible to restrain uncomfortable feeling, which is caused by strongly activating the acceleration suppression control to avoid, for example, a natural thing such as grass, from being given to a driver. Thus, appropriate acceleration suppression control depending on the type of the obstacle is enabled, so that the drive assist to avoid an obstacle can be made appropriately.

Modifications (1) In the above-described embodiment, the case where the decision level is determined by use of the decision level determination threshold illustrated in FIG. 7 has been described. However, the value of each threshold can be set appropriately depending on the sensitivity of the sonar or the travel environment (such as visibility). Also, as illustrated in FIG. 18, the decision level determination threshold to be set according to the vehicle speed may be used. Accordingly, the decision level determination can be made in consideration of a delay in the speed detection.

(2) In the above-described embodiment, the case where the present disclosure is applied to the acceleration suppression control to avoid the obstacle has been described. However, the present disclosure may be used in combination of acceleration suppression control at the time of parking the vehicle. In this case, a camera is provided as the surrounding environment recognition sensor 1, so that the surrounding environment recognition information operation unit 10A can recognize the parking frame from the image captured by the camera. Then, it is determined whether or not there is an obstacle existing in the course ahead in the travel direction while the vehicle is being manipulated for parking, the acceleration suppression control for parking the vehicle at an intended parking location is carried out. In addition, when there is an obstacle existing ahead the parking frame, the acceleration suppression control depending on the decision level of the obstacle is carried out. Thus, the acceleration suppression effect can be brought out sufficiently, even if the accelerator pedal is mistakenly manipulated while the vehicle is being manipulated for parking.

(3) In the above-described embodiment, the case where both of the drive force limit control and the brake force control are carried out as the acceleration suppression control has been described. However, only either one of them may be carried out. In particular, as the acceleration suppression control at the time of turning on the ignition, sufficient effects are obtainable by carrying out only the drive force limit control.

According to a vehicle acceleration suppression device in one embodiment of the present disclosure, the type of the obstacle that has been detected by capturing the reflection wave of the transmission wave emitted by an in-vehicle sonar is determined, a control manner of the acceleration suppression control can be changed depending on the type of the obstacle. In other words, the magnitude of the control amount or activation/non-activation of the acceleration suppression control can be changed depending on the type of the obstacle. Thus, while restraining uneasy feeling given to a driver, the drive assist to avoid the obstacle can be carried out appropriately and it is useful.

The invention claimed is:

1. A vehicle acceleration suppression device, comprising:
an in-vehicle sonar configured to emit a transmission wave forward in a travel direction of a vehicle;
an obstacle distance detector configured to receive a reflection wave of the transmission wave emitted by the in-vehicle sonar, and to detect a distance between the vehicle and an obstacle existing ahead in the travel direction of the vehicle;
an obstacle height determination unit configured to receive the reflection wave of the transmission wave emitted by the in-vehicle sonar, and to determine whether or not the obstacle existing ahead in the travel direction of the vehicle is a tall obstacle that is as tall as the vehicle or taller than the vehicle;
an obstacle type determination unit configured to determine a type of the obstacle based on at least a first-time detection distance that is the distance between the vehicle and the obstacle detected by the obstacle distance detector for a first time while the vehicle is approaching the obstacle, and a height determination distance that is the distance between the vehicle and the obstacle detected by the obstacle distance detector when the obstacle distance detector determines that the obstacle is the tall obstacle for the first time while the vehicle is approaching the obstacle; and
an acceleration suppression controller configured to carry out acceleration suppression control for suppressing acceleration of the vehicle in a control manner depending on a determination result made by the obstacle type determination unit,
when it is determined that the vehicle has approached the obstacle at an approach degree equal to or higher than a predefined approach degree based on the distance between the vehicle and the obstacle detected by the obstacle distance detector.

2. The vehicle acceleration suppression device according to claim 1,
wherein the in-vehicle sonar is configured to emit the transmission wave at every given time, and
wherein the obstacle height determination unit is configured to determine that the obstacle existing ahead in the travel direction of the vehicle is the tall obstacle, when the obstacle height determination unit receives the reflection wave having two strong peaks each higher than a predefined obstacle detection threshold in a given period with respect to a single transmission of the transmission wave.

3. The vehicle acceleration suppression device according to claim 1, wherein the obstacle type determination unit is configured to determine a wall, another vehicle, an edge stone, or a natural thing, as the type of the obstacle.

4. The vehicle acceleration suppression device according to claim 3, wherein the obstacle type determination unit is configured to set an obstacle decision level as an index representing the type of the obstacle, and to set the obstacle decision level to a lower value in an order of the wall, the another vehicle, the edge stone, and the natural thing.

5. The vehicle acceleration suppression device according to claim 4, wherein the obstacle type determination unit is configured to set the obstacle decision level to be higher, as the first-time detection distance is longer.

6. The vehicle acceleration suppression device according to claim 5, wherein the obstacle type determination unit is configured to determine that the type of the obstacle is the natural thing, when the first-time detection distance is shorter than a limit distance in which the reflection wave from the natural thing of the transmission wave of the in-vehicle sonar is receivable.

7. The vehicle acceleration suppression device according to claim 4, wherein the obstacle type determination unit is configured to set the obstacle decision level to be higher, as the height determination distance is longer.

8. The vehicle acceleration suppression device according to claim 4, wherein the obstacle type determination unit is configured to set the obstacle decision level to be higher, as a distance obtained by subtracting the height determination distance from the first-time detection distance is shorter.

9. The vehicle acceleration suppression device according to claim 4,
wherein the in-vehicle sonar is configured to include a plurality of sonars arranged in a width direction of the vehicle, and
wherein the obstacle type determination unit is configured to set the obstacle decision level to be higher, as a plural-number detection distance that is the distance between the vehicle and the obstacle when the reflection waves from an identical obstacle of the transmission waves emitted by at least two adjacent sonars are received for the first time.

10. The vehicle acceleration suppression device according to claim 4,
wherein the obstacle type determination unit is configured to set the obstacle decision level to be a maximum level, when the obstacle distance detector maintains a state of determining that the obstacle exists ahead in the travel direction of the vehicle even if the distance between the vehicle and the obstacle becomes shorter than a predefined short distance threshold, and
wherein the obstacle type determination unit is configured to set the obstacle decision level to be a minimum level, when the distance between the vehicle and the obstacle existing ahead in the travel direction of the vehicle becomes shorter than the predefined short distance threshold and the obstacle distance detector determines that the obstacle does not exist from the state of determining that the obstacle exists.

11. The vehicle acceleration suppression device according to claim 4,
wherein the acceleration suppression controller is configured to carry out drive force limit control for limiting an acceleration instruction value, which depends on a manipulation amount of an acceleration instruction manipulation element to be manipulated by a driver for giving an acceleration instruction, to an acceleration limit value which depends on the obstacle decision level as an upper limit, and
wherein the acceleration limit value is set to a smaller value, as the obstacle decision level is higher.

12. The vehicle acceleration suppression device according to claim 4,
wherein the acceleration suppression controller is configured to carry out brake force control for generating a brake force onto the vehicle depending on the distance between the vehicle and the obstacle detected by the obstacle distance detector, and
wherein the brake force is set to a larger value, as the obstacle decision level is higher.

13. The vehicle acceleration suppression device according to claim 1, further comprising
an obstacle type storage unit configured to store the type of the obstacle that has been determined most recently by the obstacle type determination unit before an ignition switch is turned off,
wherein the acceleration suppression controller is configured to employ the type of the obstacle stored in the obstacle type storage unit as the type of the obstacle detected by the obstacle type determination unit, when an ignition switch is turned on.

14. The vehicle acceleration suppression device according to claim 13, further comprising:
an obstacle distance storage unit configured to store the distance between the vehicle and the obstacle that has been detected most recently by the obstacle distance detector before the ignition switch is turned off, as an obstacle distance storage value; and
a validity determination unit configured to determine validity of the type of the obstacle stored in the obstacle type storage unit based on the obstacle distance storage value stored in the obstacle distance storage unit and an obstacle distance detection value that is the distance between the obstacle and the vehicle detected by the obstacle distance detector, when the ignition switch is turned on.

15. The vehicle acceleration suppression device according to claim 14, wherein the validity determination unit is configured to determine that the type of the obstacle stored in the obstacle type storage unit is valid, when a difference between the obstacle distance storage value stored by the obstacle distance storage unit and the obstacle distance detection value detected by the obstacle distance detection unit falls within an allowable range, at the time of turning on the ignition switch.

16. A vehicle acceleration suppression method, comprising:
receiving a reflection wave of a transmission wave emitted forward in a travel direction of a vehicle by an in-vehicle sonar to detect a distance between the vehicle and an obstacle existing ahead in the travel direction of the vehicle;
receiving the reflection wave of the transmission wave emitted by the in-vehicle sonar to determine whether or not the obstacle existing ahead in the travel direction of the vehicle is a tall obstacle that is as tall as the vehicle or taller than the vehicle;
determining a type of the obstacle based on at least a first-time detection distance that is the distance between the vehicle and the obstacle detected for a first time while the vehicle is approaching the obstacle, and a height determination distance that is the distance between the vehicle and the obstacle detected when it is determined that the obstacle is the tall obstacle for the first time while the vehicle is approaching the obstacle; and carrying out acceleration suppression control for suppressing acceleration of the vehicle in a control manner depending on the type of the obstacle that has been determined, when it is determined that the vehicle has approached the obstacle at an approach degree equal to or higher than a predefined approach degree based on the distance between the vehicle and the obstacle.

* * * * *